(12) United States Patent
Bird et al.

(10) Patent No.: US 12,159,211 B2
(45) Date of Patent: Dec. 3, 2024

(54) AUTOMATED MERGE CONFLICT RESOLUTION WITH TRANSFORMERS

(71) Applicant: MICROSOFT TECHNOLOGY LICENSING, LLC., Redmond, WA (US)

(72) Inventors: Christian Bird, Redmond, WA (US); Shuvendu K. Lahiri, Sammamish, WA (US); Todd Douglas Mytkowicz, Redmond, WA (US); Neelakantan Sundaresan, Bellevue, WA (US); Alexey Svyatkovskiy, Bellevue, WA (US)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 787 days.

(21) Appl. No.: 17/175,528

(22) Filed: Feb. 12, 2021

(65) Prior Publication Data
US 2022/0164626 A1    May 26, 2022

Related U.S. Application Data

(60) Provisional application No. 63/116,595, filed on Nov. 20, 2020.

(51) Int. Cl.
| | | |
|---|---|---|
| G06N 3/02 | (2006.01) |
| G06F 8/30 | (2018.01) |
| G06F 8/71 | (2018.01) |
| G06N 3/044 | (2023.01) |
| G06N 3/045 | (2023.01) |
| G06N 3/088 | (2023.01) |
| G06N 7/01 | (2023.01) |

(52) U.S. Cl.
CPC .............. *G06N 3/02* (2013.01); *G06F 8/311* (2013.01); *G06N 3/044* (2023.01); *G06N 3/045* (2023.01); *G06N 3/088* (2013.01); *G06N 7/01* (2023.01); *G06F 8/71* (2013.01)

(58) Field of Classification Search
CPC .............. G06F 3/02; G06F 3/01; G06F 8/311
USPC .................................................. 717/168–174
See application file for complete search history.

(56) References Cited

U.S. PATENT DOCUMENTS

| | | | |
|---|---|---|---|
| 7,013,304 B1 | 3/2006 | Hinrich | |
| 9,128,804 B2* | 9/2015 | Gores | ........................ G06F 8/71 |
| 9,141,682 B1* | 9/2015 | Adoc, Jr. | .................. G06F 9/52 |

(Continued)

OTHER PUBLICATIONS

Svyatkovskiy et al., "Program Merge Conflict Resolution via Neural Transformers", ACM, pp. 822-833 (Year: 2022).*

(Continued)

*Primary Examiner* — Anil Khatri

(57) ABSTRACT

An automated system for resolving program merges uses neural transformers with attention. In one aspect, a neural encoder transformer model is trained from developer-resolved merge conflicts to learn to predict a resolution strategy that aids a developer in constructing a merged program. In a second aspect, a neural decoder transformer model is trained on the syntax and semantics of different source code programming languages to predict a merge resolution consisting of interleaved lines of source code from programs A, B, or O, where programs A and B contain changes to code base O.

19 Claims, 15 Drawing Sheets

(56) References Cited

U.S. PATENT DOCUMENTS

| | | | |
|---|---|---|---|
| 9,430,229 B1* | 8/2016 | Van Zijst | G06F 9/3844 |
| 9,471,304 B1* | 10/2016 | Fuchs | G06F 8/71 |
| 9,575,764 B1 | 2/2017 | Turner et al. | |
| 9,734,447 B1* | 8/2017 | Diev | G06N 5/045 |
| 10,600,005 B2* | 3/2020 | Gunes | G06N 3/08 |
| 11,030,747 B1* | 6/2021 | Feng | G06T 11/008 |
| 11,055,639 B1* | 7/2021 | Cay | G06F 9/547 |
| 11,119,759 B2* | 9/2021 | Samudrala | G06N 3/04 |
| 11,238,332 B2* | 2/2022 | Ainslie | G06N 3/084 |
| 11,397,750 B1* | 7/2022 | Lekakis | G06F 16/275 |
| 11,507,655 B1* | 11/2022 | Ketireddy | G06F 8/70 |
| 11,714,617 B1 | 8/2023 | Sundaresan | |
| 11,853,746 B2 | 12/2023 | Groenewegen | |
| 11,868,421 B1* | 1/2024 | Giles | G06N 3/08 |
| 2015/0220331 A1 | 8/2015 | Bernstein et al. | |
| 2015/0268948 A1 | 9/2015 | Plate | |
| 2015/0269494 A1 | 9/2015 | Kardes | |
| 2016/0267125 A1 | 9/2016 | Tsofi | |
| 2017/0091651 A1 | 3/2017 | Miao et al. | |
| 2017/0212829 A1 | 7/2017 | Bales | |
| 2020/0249918 A1 | 8/2020 | Svyatkovskiy et al. | |
| 2021/0056007 A1 | 2/2021 | Vinu | |
| 2021/0191715 A1 | 6/2021 | Samudrala | |
| 2022/0027563 A1* | 1/2022 | Zhicharevich | G06N 3/045 |
| 2022/0164626 A1 | 5/2022 | Bird et al. | |
| 2022/0398462 A1 | 12/2022 | Clement et al. | |

OTHER PUBLICATIONS

Brindescu et al., "Planning for Untangling: Predicting the Difficulty of Merge Conflicts", ACM, pp. 801-811 (Year: 2020).*

Guimaraes et al., "Improving Early Detection of Software Merge Conflicts", IEEE, pp. 342-352 (Year: 2012).*

Feng et al, "Evolving Transformer Architecture for Neural Machine Translation", ACM, pp. 273-274 (Year: 2021).*

Wu et al, "Genetic Algorithm-based Transformer Architecture Design for Neural Machine Translation", ACM, pp. 98-104 (Year: 2022).*

Huang et al, "Accelerating Transformer for Neural Machine Translation", ACM, pp. 191-197 (Year: 2021).*

Zhang et al, "Using Pre-trained Language Models to Resolve Textual and Semantic Merge Conflicts (Experience Paper)", ACM, pp. 77-88 (Year: 2022).*

Zhu, et al., "Conflict Resolution for Structured Merge via Version SpaceAlgebra", In Proceedings of the Proceedings of the ACM on Programming Languages, Nov. 2018, 25 Pages.

Alon, et al., "code2seq: Generating Sequences from Structured Representations of Code", In Proceedings of International Conference on Learning Representations, May 6, 2019, pp. 1-22.

Apel, et al., "Semistructured Merge in Revision Control Systems", In Proceedings of the Fourth International Workshop on Variability Modelling of Software-intensive Systems, Jan. 27, 2010, 7 Pages.

Apel, et al., "Structured merge with auto-tuning: balancing precision and performance", In Proceedings of the 27th IEEE/ACM International Conference on Automated Software Engineering, Sep. 3, 2012, pp. 120-129.

Brindescu, et al., "Lifting the Curtain on Merge Conflict Resolution: A Sensemaking Perspective", In Proceedings of the IEEE International Conference on Software Maintenance and Evolution, Sep. 28, 2020, pp. 534-545.

Brindescu, et al., "Planning for Untangling: Predicting the Difficulty of Merge Conflicts", In Proceedings of the IEEE/ACM 42nd International Conference on Software Engineering, May 2020, 11 Pages.

Brun, et al., "Proactive Detection of Collaboration Conflicts", In Proceedings of the 19th ACM SIGSOFT Symposium and the 13th European Conference on Foundations of Software Engineering, Sep. 5, 2011, pp. 168-178.

Cho, et al., "Learning Phrase Representations using RNN Encoder-Decoder for Statistical Machine Translation", In Journal of Computing Research Repository, Jun. 3, 2014, 14 Pages.

Cho, et al., "Learning Phrase Representations using RNN Encoder-Decoder for Statistical Machine Translation", In Proceedings of the Conference on Empirical Methods in Natural Language Processing, Oct. 25, 2014, pp. 1724-1734.

Clement, et al., "PyMT5: Multi-mode Translation of Natural Language and Python Code with Transformers", In Proceedings of the Conference on Empirical Methods in Natural Language Processing, Nov. 16, 2020, pp. 9052-9065.

Nguyen, et al., "Discriminative Features Fusion with BERT for Social Sentiment Analysis", In Proceedings of the International Conference on Industrial, Engineering and Other Applications of Applied Intelligent Systems, Sep. 22, 2020, pp. 30-35.

Dinella, et al., "Hoppity: Learning Graph Transformations to Detect and Fix Bugs in Programs", In Proceedings of International Conference on Learning Representations, Apr. 26, 2020, pp. 1-17.

Ferreira, et al., "Software Engineering Meets Deep Learning: A Literature Review", In Repository of arXiv:1909.11436v1, Sep. 25, 2019, pp. 1-18.

Fraternali, et al., "Almost Rerere: an approach for automating conflict resolution from similar resolved conflicts", In Proceedings of the International Conference on Web Engineering, Jun. 9, 2020, pp. 1-16.

Ghiotto, et al., "On the Nature of Merge Conflicts: A Study of 2,731 Open Source Java Projects Hosted by GitHub", In Journal of IEEE Transactions on Software Engineering, vol. 46, Issue 8, Aug. 1, 2020, pp. 892-915.

Godefroid, et al., "Learn&fuzz: Machine learning for input fuzzing", In Proceedings of 32nd IEEE/ACM International Conference on Automated Software Engineering, Oct. 30, 2017, pp. 50-59.

Gu, et al., "Deep Code Search", In Proceedings of the IEEE/ACM 40th International Conference on Software Engineering (ICSE), May 27, 2018, pp. 933-944.

Gu, et al., "Incorporating Copying Mechanism in Sequence-to-Sequence Learning", In Proceedings of the 54th Annual Meeting of the Association for Computational Linguistics, vol. 1, Aug. 7, 2016, pp. 1631-1640.

Jensen, et al.. "Type analysis for JavaScript", In Proceedings of 16th International Static Analysis Symposium, Aug. 9, 2009, pp. 1-18.

Kalliamvakou, et al., "The promises and perils of mining github", In Proceedings of the 11th Working Conference on Mining Software Repositories, May 31, 2014, pp. 92-101.

Karampatsis, et al., "Big Code I= Big Vocabulary: Open-Vocabulary Models for Source Code", In Proceedings of the 42nd International Conference on Software Engineering (ICSE), May 23, 2020, pp. 1073-1085.

Kashyap, et al., "JSAI: a static analysis platform for JavaScript", In Proceedings of the 22nd ACMSIGSOFT international symposium on Foundations of Software Engineering, Nov. 16, 2014, pp. 121-132.

Khanna, et al., "A formal investigation of diff3", In International Conference on Foundations of Software Technology and Theoretical Computer Science, Dec. 2007, pp. 485-496.

Li, et al., "Deep learning in software engineering", In Repository of arXiv:1805.04825, May 2018, pp. 1-10.

Mens. Tom, "A state-of-the-art survey on software merging", In Proceedings of IEEE transactions on software engineering vol. 28, Issue 5, May 2002, pp. 449-462.

Owhadi-Kareshk, et al., "Predicting Merge Conflicts in Collaborative Software Development", In Repository of arXiv:1907.06274, Jul. 14, 2019, 11 Pages.

Panthaplackel, et al., "Copy That! Editing Sequences by Copying Spans", In Proceedings of Eighth International Conference on Learning Representations, Apr. 26, 2020, pp. 1-15.

Papineni, et al., "BLEU: A Method for Automatic Evaluation of Machine Translation", In Proceedings of the 40th Annual Meeting on Association for Computational Linguistics, Jul. 6, 2002, pp. 311-318.

Ramesh, Shashank, "Semantic Code Search Using Transformers and BERT-Part I: Overview and Data Preprocessing", Retrieved from: https://medium.com/swlh/semantic-code-search-using-transformers-and-bert-part-i-overview-and-data-preprocessing-fee34be134e1, Jul. 10, 2020, 14 Pages.

(56) References Cited

OTHER PUBLICATIONS

Rijsbergen, C. J. Van, "Information Retrieval", In Publication of Butterworth-Heinemann, Jan. 1979, 153 Pages.

Sousa, et al., "Verified Three-way Program Merge", In Proceedings of the ACM on Programming Languages, vol. 2, Nov. 2018, 29 Pages.

Sutskever, et al., "Sequence to Sequence Learning with Neural Networks", In Proceedings of the 27th International Conference on Neural Information Processing Systems, Dec. 8, 2014, 9 Pages.

Svyatkovskiy, et al., "Pythia: AI-assisted Code Completion System", In Proceedings of the 25th ACM SIGKDD International Conference on Knowledge Discovery & Data Mining, Aug. 4, 2019, pp. 2727-2735.

Tufano, et al., "An Empirical Study on Learning Bug-Fixing Patches in the Wild via Neural Machine Translation.", In Proceedings of ACM Transactions on Software Engineering and Methodology, Sep. 2019, 29 Pages.

Vinyals, et al., "Pointer Networks", In Proceedings of the Annual Conference on Neural Information Processing Systems, Dec. 7, 2015, pp. 1-9.

Waddicor, Alice, "Using SemanticMerge to fix Git merge conflicts", Retrieved from: https://endjin.com/blog/2014/08/using-semanticmerge-to-fix-git-merge-conflicts, Aug. 20, 2014, 16 Pages.

Wang, et al., "Automatically Learning Semantic Features for Defect Prediction", In Proceedings of the 38th International Conference on Software Engineering, May 14, 2016, pp. 297-308.

Westfechtel, et al., "Structure-oriented merging of revisions of software documents", In Proceedings of the 3rd international workshop on Software configuration management, May 1991, pp. 68-79.

Yang, et al., "A Program Integration Algorithm That Accommodates Semantics-preserving Transformations", In Journal of ACM Transactions on Software Engineering and Methodology, Jul. 1992, pp. 310-354.

Yin, et al., "Learning to Represent Edits", In International Conference on Learning Representations, May 6, 2019, pp. 1-22.

Zhou, et al., "Sequential Copying Networks", In Proceedings of The Thirty-Second AAAI Conference on Artificial Intelligence, Feb. 2, 2018, 8 Pages.

Jiang, et al., "Combining Generative and Discriminative Approaches to Unsupervised Dependency Parsing via Dual Decomposition", In Proceedings of the Conference on Empirical Methods in Natural Language Processing, Sep. 7, 2017, pp. 1689-1694.

Rajapakse, Thilina, "Bart for Paraphrasing with Simple Transformers", Retrieved from: https://towardsdatascience.com/bart-for-paraphrasing-with-simple-transformers-7c9ea3dfdd8c, Aug. 5, 2020, 20 Pages.

Pordel, Mostafa, "A Metamodel independent approach for Conflict Detection to support distributed development in MDE", A Thesis Submitted in Partial Fulfillment of Requirements for the Master Degree of Software Engineering, School of Innovation, Design and Engineering, Mälardalen University, Sep. 10, 2009, 50 Pages.

"MergeResolver—Automatic Merge Conflict Resolution", Retrieved from: http://web.archive.org/web/20200622131625/https:/blogs.grammatech.com/mergeresolver-automatic-merge-conflict-resolution, Jun. 22, 2020, 10 Pages.

Feng, et al., "CodeBERT: A Pre-Trained Model for Programming and Natural Languages", In Repository of arXiv:2002.08155v3, Apr. 27, 2020, 10 Pages.

"International Search Report and Written Opinion Issued in PCT Application No. PCT/US21/052494", Mailed Date: Jan. 21, 2022, 13 Pages.

Svyatkovskiy, et al., "MergeBERT: Program Merge Conflict Resolution via Neural Transformers", In Repository of arXiv:2109.00084v2, Sep. 8, 2021, 16 Pages.

International Search Report and Written Opinion Issued in PCT Application No. PCT/US21/056782, Mailed Date: Feb. 14, 2022, 13 Pages.

Zao, et al., "Neural Networks for Modeling Source Code Edits", In Repository of arXiv:1904.02818v1, Apr. 4, 2019, 18 Pages.

Dinella, et al., "DeepMerge: Learning to Merge Programs", In Repository of arXiv:2105.07569v3, Sep. 6, 2021, 12 Pages.

Non-Final Office Action mailed on Jun. 12, 2024, in U.S. Appl. No. 17/175,521, 32 pages.

Communication under Rule 71(3) Received for European Application No. 21811600.2, mailed on Jun. 3, 2024, 8 pages.

Communication under Rule 71(3) received in European Application No. 21805693.5, mailed on May 31, 2024, 8 pages.

Decision to grant a European patent pursuant to Article 97(1) Received for European Application No. 21811600.2, mailed on Sep. 26, 2024, 02 pages.

Decision to grant Received for European Application No. 21805693.5, mailed on Oct. 4, 2024, 2 pages.

\* cited by examiner

AUTOMATED MERGE CONFLICT RESOLUTION WITH TRANSFORMERS

CROSS-REFERENCE TO RELATED APPLICATIONS

The present application claims the benefit of the earlier filed provisional application having Ser. No. 63/116,595 filed on Nov. 20, 2020, which is incorporated by reference in its entirety.

BACKGROUND

During a software development project, a team of developers may collaborate on the source code, documentation, test scripts and other files and collections of data which are stored in a repository accessible to the developers of the team. To manage the changes made to a file during development, the files may be stored in a repository managed by a version control system. The version control system maintains the versions of the files of a repository and the history of changes made to the files over time.

In a distributed version control system, the repository is distributed to each collaborator including the complete revision history and a working copy of the code base. A branch is a duplication of a file subject to the version control system for an independent line of development so that changes can be made to the duplicate file independent of the original file. A merge command is used to integrate changes across the two branches in a version control system. A merge can be performed automatically if there is no conflict. A merge conflict arises when two programs make changes to the same source code segment. The merge conflict needs to be resolved before the revisions are merged back to the repository and in a manner that does not introduce subtle bugs or unwanted program behavior. The merge command does not provide suggestions on how to perform a merge rather indicates the existence of a merge conflict when a conflict is detected. Often the user has to resolve the conflict by combining the changes or selecting only one of the changes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The subject matter disclosed pertains to an automated system for resolving program merges using neural transformers with attention. In one aspect, a neural encoder transformer system is trained from developer-resolved merge conflicts to learn to predict a resolution strategy that aids a developer in constructing a merged program. In a second aspect, a neural decoder transformer model system is trained on the syntax and semantics of different source code programming languages to learn to predict a merge resolution given a merge tuple (A, B, O), where programs A and B have modifications to code base O.

The neural encoder transformer system is composed of n neural encoder models, where each neural encoder model receives a unique input embedding representing different aspects of the merge conflict. The output of each encoder model is aggregated to compute a probability distribution for c classes, where each class represents a resolution strategy. The predicted resolution strategy is used to aid a developer in constructing a merge program.

The neural decoder transformer system is composed of a neural decoder transformer model trained to learn the syntax and semantics of various programming languages. The neural decoder transformer model is used in the generation of a merge resolution that is the interleaving of the lines of source code in programs A, B, and code base O. The model is used to determine the order in which the lines are interleaved based on the probabilities of the next token predicted by the model in a given context.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
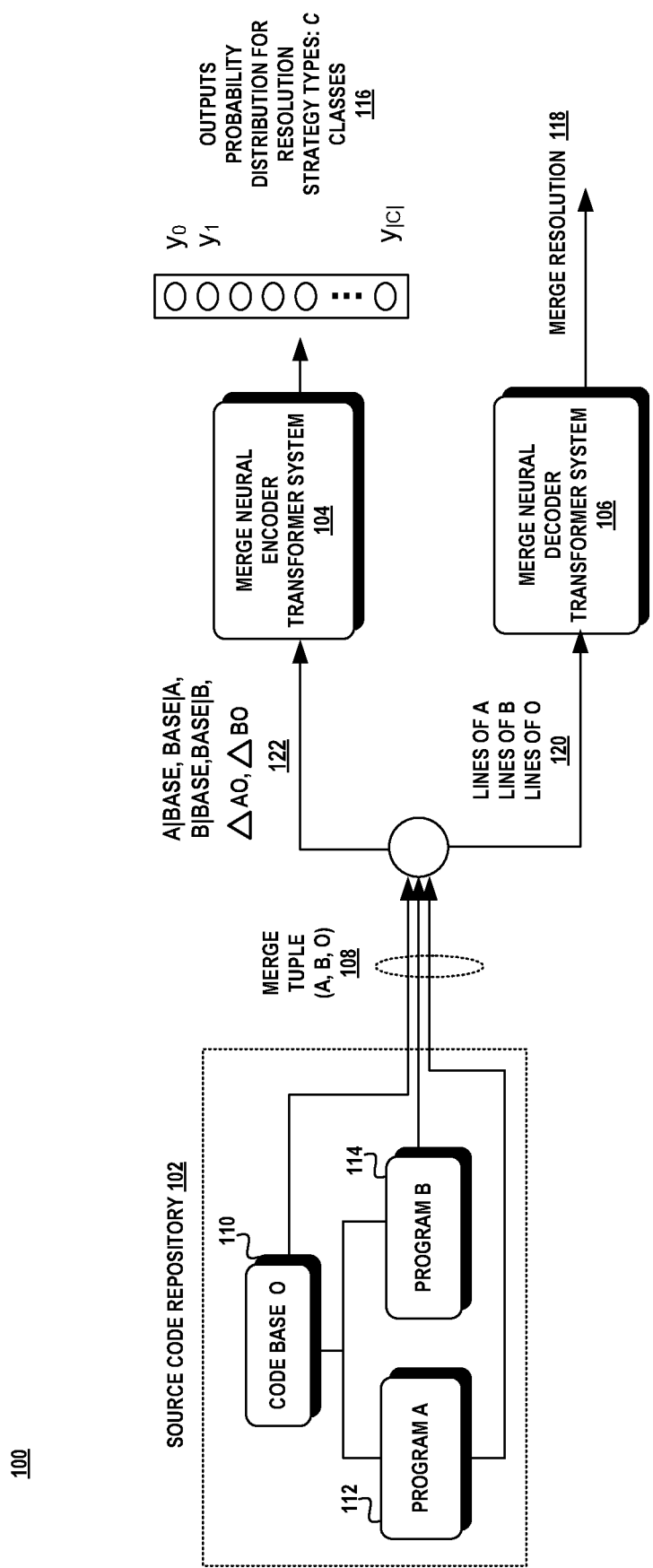
FIG. 1 illustrates an exemplary merge resolution system that uses neural transformers with attention to assist developers with a merge conflict.

The subject matter disclosed pertains to an automated system for resolving program merges using neural transformers with attention.

A three-way program merge takes as input two programs, A and B, obtained by modifying a common base program O and either provides a merged program or resolution R that preserves the intent of the changes made in A and B over O automatically. The techniques described herein formulate the problem of program merging as a sequence-to-sequence supervised learning task that trains a neural transformer model with attention to learn the syntactic changes and semantic intents of the program changes made to a code base in order to either predict an output sequence R representing a merge resolution or predict a resolution strategy that aids a developer in resolving the merge conflict. Machine learning offers an approach to merge resolution that incorporates the syntactic changes and semantic intents of the program changes from developer-resolved merge conflicts.

Source code repositories may offer three-way merge tools that automatically merge changes made to different branches of a repository. These tools utilize semantic-based techniques or text-based techniques both of which are prone to introducing unwanted behaviors and errors. A text-based merge technique treats programs as list-structured textual data. One example of a text-based merge program is the Unix utility diff3. This technique aligns the two-way diffs of program A over the common code base program O into a sequence of diff slots and incorporates the textual change from one of A or B at each slot unless both programs change a common slot. If both programs change a common slot, a textual merge conflict is produced that requires manual resolution of the conflicting textual changes.

Semantic-based merge techniques are based on an analysis of the behavior of the program execution of the proposed changes. A semantic-based merge technique relies on program analysis techniques that analyze output values altered by the changes. The two programs A and B make conflicting changes if and only if they both alter the behavior of an output variable in a common execution path. However, this technique has limited scalability and application. For example, dynamic programming features, such as reflection in some object-oriented programming languages (C#, Java) and eval in Python and JavaScript cannot be determined statically and are performed at runtime.

The machine learning merge techniques overcome these limitations by using a data-driven approach that learns to predict a merge resolution from real-world merges and merge-conflict data. This data-driven approach considers the semantics of the proposed merger, the syntax of the programming language, and the textual differences between the changes.

Machine learning pertains to the use and development of computer systems that are able to learn and adapt without following explicit instructions, by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping. Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning.

A neural transformer with attention is a type of neural network architecture that includes attention units. In one aspect, a neural encoder transformer model with attention (i.e., neural encoder transformer model) is trained from developer-resolved merge conflicts to learn to predict a resolution strategy that aids a developer in constructing a merged program. In a second aspect, a neural decoder transformer model with attention (i.e., neural decoder transformer model) trained on the syntax and semantics of different source code programming languages to predict a merge resolution as an interleaving of source lines from program A, program B and the code base.

The neural encoder transformer system is composed of n neural encoder transformer models, that are pre-trained on source code programs in different programming languages. The pre-trained neural encoder transformer models are trained to learn the syntax and semantics of programming languages. The neural encoder transformer models are then fine-tuned on distinct tasks derived from token sequences and edit sequences of a merge tuple (A, B, O).

The output of each encoder model is aggregated to compute a probability distribution for c classes, where each class represents a resolution strategy. The predicted resolution strategy is used to aid a developer in constructing a merge program.

The neural decoder transformer model is trained on source code programs to learn the syntax and semantics of various programming languages. The neural decoder transformer model generates a merge resolution that is the interleaving of the lines of source code in programs A, B, and code base O. The model predicts the order of the lines based on the probability of the next token given the context $P(\text{next\_token}|\text{line}_j+\text{prefix})$, where prefix is the source code segment that precedes the resolution region and $\text{line}_j$ is one of the lines of source code in programs A, B, or O. The line associated with the token having the highest probability is selected as the next line to include in a resolution based on the source code naturalness hypothesis. Under this hypothesis, source code is a form of communication and as such, a large corpra of source code contains hidden patterns that can be exploited by machine learning to learn how developers naturally write and use source code. Hence, a model trained on a large corpra of source code can learn patterns to predict how a developer would formulate a merge resolution from the lines of source code contained in a merge tuple.

The neural encoder transformer model treats merge resolution as a discriminative task where the model directly maps an unobserved merge tuple (A, B, O) to a class label or resolution strategy based on an observed training dataset. The neural decoder transformer model considers merge resolution as a generative task where each token in a predicted merge resolution is based on the preceding tokens in the resolution.

Attention now turns to a further description of the systems, devices, methods for automated merge conflict resolution with neural transformer models.

Merge Resolution Using Neural Transformers

FIG. 1 illustrates the components of an exemplary system 100 for resolving a three-way program merge using neural transformers. A merge tuple (A, B, O) 108 is obtained from a source code repository 102 that includes a program A 112 and a program B 114, both having changes to a code base O 110. In one aspect, the merge tuple is transformed into aligned token sequences and edit sequences and input to a neural encoder transformer system 104 to predict a resolution strategy. In a second aspect, a neural decoder transformer system 106 receives an embedding of each program of the merge tuple and outputs a predicted merge resolution.

A source code repository 102 is a file archive that hosts projects having source code files and other data (e.g., scripts, test cases, etc.) shared by multiple developers. The source code repository 102 may be private and internal to an organization, group, enterprise or user or may be publicly-accessible through the Internet. The source code repository 102 may contain source code files from different domains, such as without limitation, scientific computing, web development, dataflow programming, machine learning, and the like.

The source code repository 102 may include a version control system that manages changes made to the source code files, such as Git and Mercurial. In one aspect, the source code repository 102 is distributed where each developer has their own local repository of the source code with the history and versions of the source code.

Although the disclosure uses references from Git to describe the techniques described herein, it should not be construed as limiting the disclosed techniques to this particular source code repository and/or version control system.

A developer may use a copy of a source code file to develop features isolated from other copies of the source code file by placing the copy in a branch. Branches are used to distinguish a version of a source code file from its parent. A commit command records the changes made to a local repository. A merge command merges changes made in a source code file of a branch back to the parent source code file in the parent of master branch.

In a three-way merge, there are two branches to a parent branch. One branch contains source code program A 112 having changes to code base O 110, a second branch contains source code program B 114 having changes to code O 110, and the parent branch includes the code base O 110. A merge tuple (A, B, O) is extracted from the source code repository.

In one aspect, aligned token sequences and edit sequences 122 derived from a merge tuple (A, B, O) 108 is input into a neural encoder transformer system 104 which outputs a probability distribution of resolution strategy classes 116. In one aspect, a resolution strategy consists of the following classes:

(1) A—take changes proposed in branch A as a resolution;
(2) B—take changes proposed in branch B as a resolution;
(3) Base—take the code state of the code base;
(4) AB—take a string concatenation of the changes in A first and then the changes in B as a resolution;
(5) BA—take a string concatenation of changes in B first followed by the changes in A as a resolution (reverse order as compared to AB);
(6) REM-BASE-A—consider the physical lines composing conflicting regions of A and Base. This set of lines is denoted by $\{L^A_i\}$ i=0 ... N, and $\{L^O_i\}$ i=0 ... N. If the intersection of these lines is not empty, $S=\{L^A_i\} \cap \{L^O_i\} \neq 0$, then a possible resolution is constructed by removing lines in S from $\{L^A_i\}$, i.e.: $\{L^A_i\}-S$. In other words, remove the lines of the Base from A and take program A as the resolution;
(7) REM-BASE-B—consider the physical lines composing conflicting regions of B and Base. This set of lines is denoted by $\{L^B_i\}$ i=0 ... N, and $\{L^O_i\}$ i=0 ... N. If this line intersection of these lines is not empty, $S=\{L^B_i\} \cap \{L^O_i\} \neq 0$, then a possible resolution is constructed by removing lines in S from $\{L^B_i\}$, i.e.: $\{L^B_i\}-S$. In other words, remove the lines of the Base from B and take program B as the resolution;
(8) REM-BASE-AB—consider the physical lines composing conflicting regions of A, B, and Base. This set of lines is denoted by $\{L^A_i\}$ i=0 ... N, $\{L^B_i\}$ i=0 ... N, and $\{L^O_i\}$ i=0 ... N. If the intersection of these lines is not empty, $S=\{L^A_i\} \cap \{L^B_i\} \cap \{L^O_i\} \neq 0$, then a possible resolution is constructed by removing lines in S from $\{L^A_i\}$ and from $\{L^B_i\}$, i.e.: $(\{L^A_i\}-S) \cup (\{L^B_i\}-S)$. In other words, remove the lines of the Base from A and B and take the lines in A first followed by the lines in B;
(9) REM-BASE-BA—consider the physical lines composing conflicting regions of A, B, and Base. This set of lines is denoted by $\{L^A_i\}$ i=0 ... N, $\{L^B_i\}$ i=0 ... N, and $\{L^O_i\}$ i=0 ... N. If the intersection of these lines is not empty $S=\{L^A_i\} \cap \{L^B_i\} \cap \{L^O_i\} \neq 0$, then a possible resolution is constructed by removing lines in S from $\{L^A_i\}$ and from $\{L^B_i\}$, i.e.: $(\{L^B_i\}-S) \cup (\{L^A_i\}-S)$. In other words, remove the lines of the Base from B and A and take the lines of B first followed by the lines of A;
(10) Empty—resolution is empty;
(11) FileEmpty—resolution file is empty (e.g. as a result of deletion during merge); and
(12) OTHERS—a meta category, which consists of arbitrary combinations or interleavings of lines, potentially with new lines or tokens added in the resolution region that were not present in the inputs. There may be resolutions where developer performs additional refactorings/fixes possibly unrelated to a merge that introduced tokens outside of the input edit sequences.

The neural decoder transformer system 106 predicts a merge resolution 118 as an interleaving of the lines from programs A, B and O 120.

Attention now turns to a description of generating the edit sequences representing the source code programs involved in a three-way merge.

Token and Edit Sequences

Figure 2:
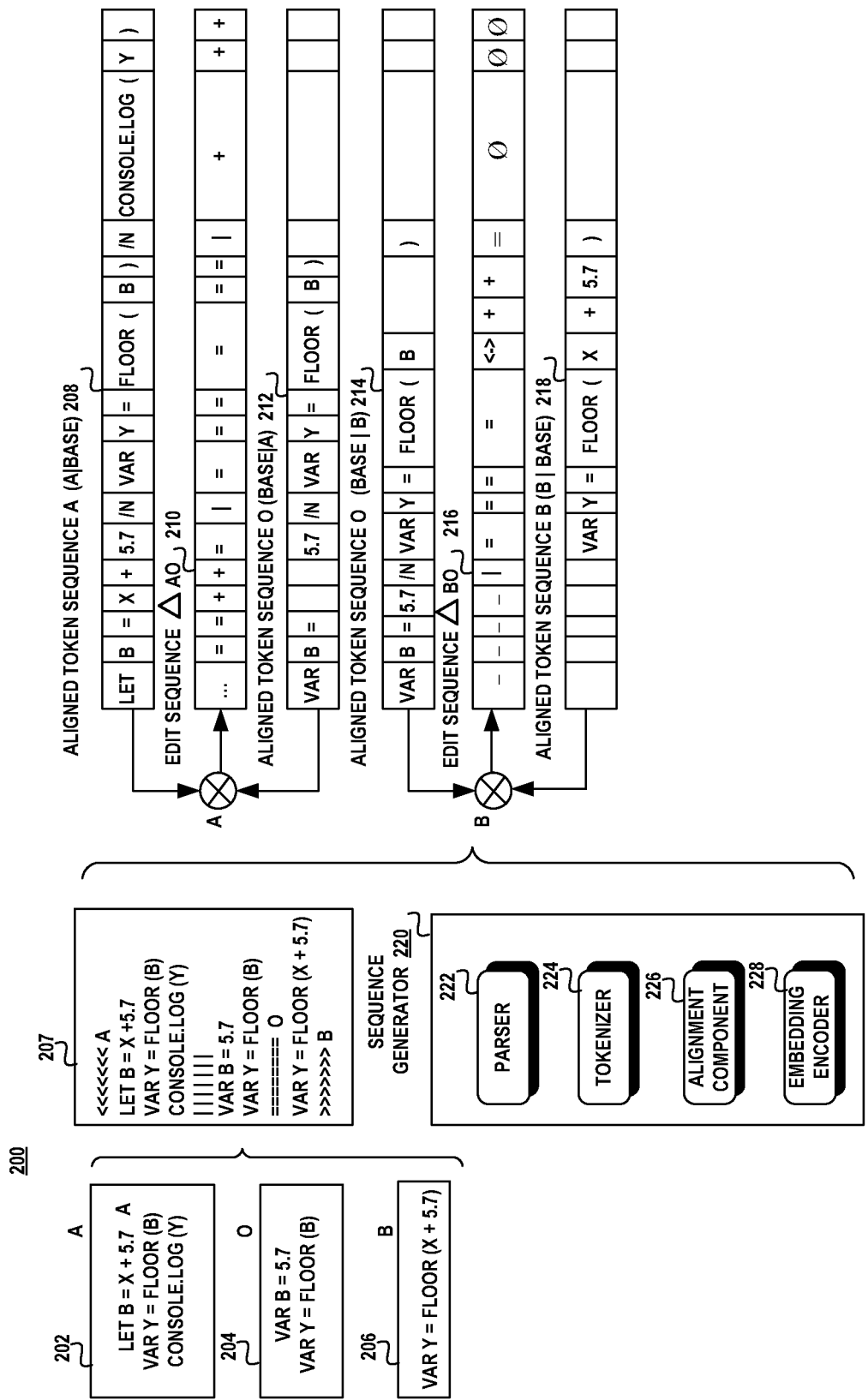
FIG. 2 is a schematic diagram illustrating the construction of the aligned token sequences and the edit input sequences extracted from a merge tuple.

Turning to FIG. 2, there is shown an example 200 of the construction of the aligned token sequences and the edit sequences. A sequence generator 220 constructs the aligned token sequences and edit sequences using a parser 222, tokenizer 224, alignment component 226 and embedding encoder 228.

There is shown program O which represents a code base 204 and programs A 202, B 206 which represent two different programs having modifications made to code base O 204. The differences in program A and program B are represented in the diff3-formatted file 207 where the portions between the markers "<<<<<<<<" and ">>>>>>>>" indicate the differences. The conflict is shown between the markers "|||||||" and "=======".

The tokenizer 224 generates a token sequence for the code base O, the changed code A, and changed code B. Each program A, B, O is parsed by the parser 222 into a concrete syntax tree which is then transformed into an ordered sequence of tokens. The alignment component 226 performs a pair-wise alignment between each changed code token sequence and the code base token sequence. The pair-wise alignment aligns similar tokens in the code base sequence with the same tokens in a changed code token sequence. The pair-wise alignment between pair of token sequences is used to generate an edit sequence. An edit sequence shows the operations (e.g., +, −, <−>) needed to transform the code base O into the changed code sequence by using special characters to denote the operations. The special characters in an edit sequence indicate the similarities and differences between the aligned tokens where "+" denotes an addition, "−" denotes a match, "<−>" denotes a replacement, "I" marks a new line, and "Ø" is a padding token used to fill out the length of a shorter sequence.

For example, the tokens in aligned token sequence A 208 are compared with the tokens in aligned token sequence O 212 to generate edit sequence ΔAO 210. The tokens in aligned token sequence A 208 are relative to the tokens in aligned token sequence O and denoted as A|Base. The tokens in aligned sequence O 212 are relative to the tokens in aligned sequence A and denoted as Base|A.

Aligned token sequence B 218 is compared with aligned token sequence O 214 to generate edit sequence ΔBO 216. The tokens in aligned token sequence O 214 are relative to the tokens in aligned token sequence B and denoted as Base|B. The tokens in aligned token sequence B 218 are relative to the tokens in aligned token sequence O and denoted as B|Base. The aligned token sequences represent the syntax of a modified program and the differences in the syntax with the code base. The edit sequences represent the operations needed to alter the code base to implement the changes in a modified program. The sequences A|Base 208, Base|A 212, B|Base 218, Base|B 214, ΔAO 210, and ΔBO 216 are concatenated in a particular order and the embedding encoder 228 generates an embedding that is used as input to the neural encoder transformer system.

Attention now turns to a discussion of the method used to train the merge neural encoder transformer model and the system and components used therein.

Training Merge Neural Encoder Transformer

Figure 3:
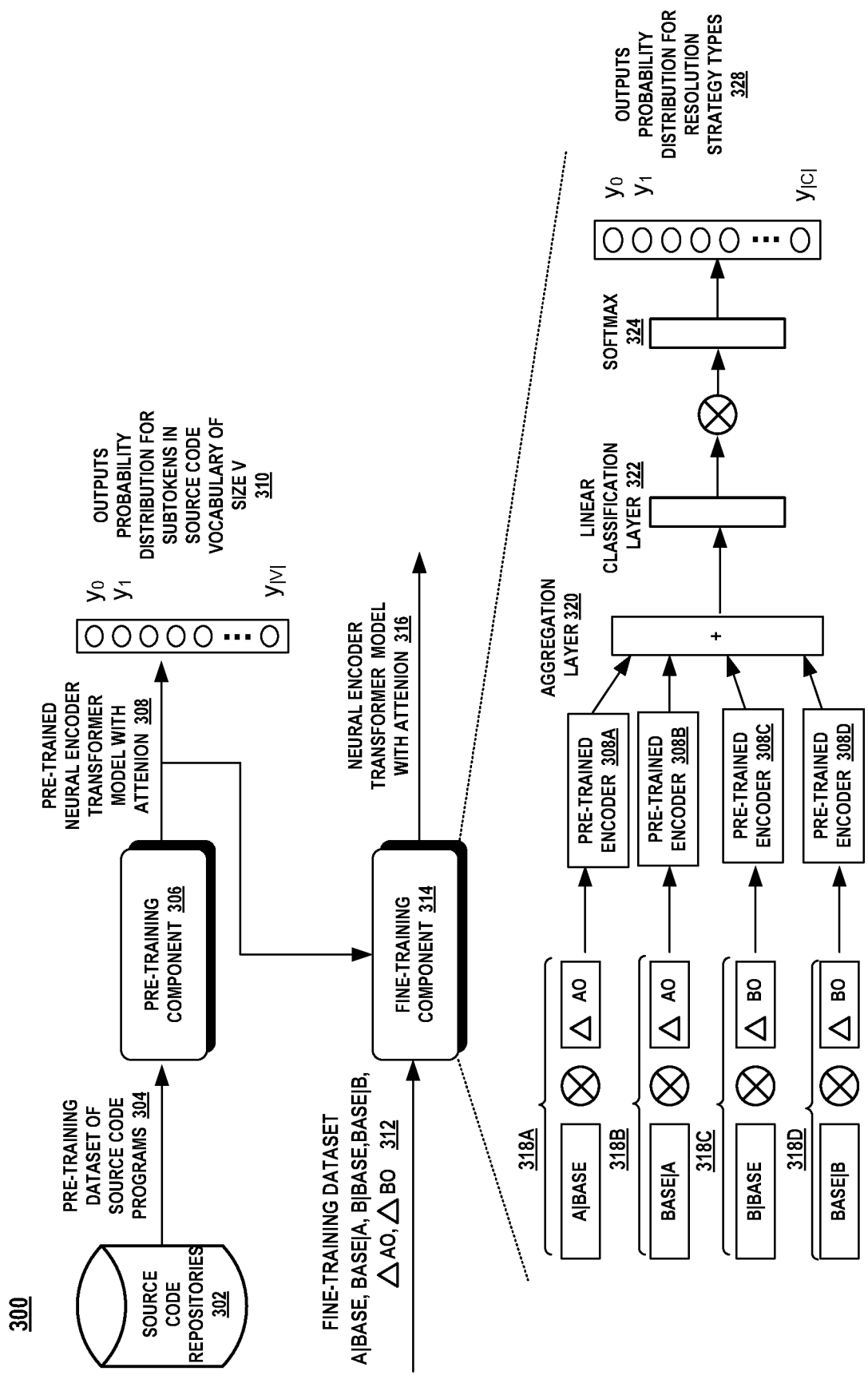
FIG. 3 is a schematic diagram illustrating an exemplary training process for the neural encoder transformer system.

FIG. 3 illustrates a system 300 for training the neural encoder transformer model and the components used therein. The neural encoder transformer model uses the Bidirectional Encoder Representations from Transformers ("BERT") architecture. BERT is designed to pre-train deep bidirectional representations from a large unlabeled corpus of source code by jointly conditioning on both left and right contexts.

The neural encoder transformer model is pre-trained with a pre-training dataset of source code programs from different programming languages 304. The source code programs may be obtained from various source code repositories 302. The pre-training dataset includes ordered sequences of tokens that are generated from the source code programs selected from the source code repositories. The ordered sequences of tokens include masked tokens which are used to train the model to predict the entire content from the context in which they appear. In this manner, the weights of the model encode information about the syntax and semantics of each programming language learned from the training dataset. The pre-trained neural encoder transformer model 308 outputs a probability distribution for each of the tokens in the source code vocabulary 310.

The use of a machine learning model presents several challenges to effectively learn a merge algorithm. There needs to be a representation of the merge inputs that identifies the edits from both programs relative to the common base. In addition, this representation needs to be a single sequence since a sequence-to-sequence translation task requires a single input sequence and a single output sequence. In the case of a three-way merge, there are four input sequences that represent the changes between programs A and B relative to the code base and two edit sequences. For this reason, the neural encoder transformer system utilizes four neural encoder transformer models to capture the relationships between the different programs and the proposed edits.

A fine-tuning component 314 trains four distinct pre-trained encoder models on select embeddings of the aligned token sequences and the edit sequences. Each pre-trained encoder model is trained on a distinct downstream task. An aligned token sequence represents the syntax of the modifications made by a particular source code program relative to the code base and an edit sequence represents the operations needed to alter the code base to incorporate the changes made by a particular source code program.

In one aspect, there are four distinct pre-trained encoders 308A, 308B, 308C, 308D ("308") where each pre-trained encoder is trained on a distinct task. Pre-trained encoder 308A receives an input embedding 318A that is a concatenation of aligned token sequence A|Base with edit sequence ΔAO, pre-trained encoder 308B receives an input embedding 318B that is a concatenation of aligned sequence Base|A with edit sequence ΔAO, pre-trained encoder 308C receives an input embedding 318C that is a concatenation of aligned token sequence B|Base with edit sequence ΔBO, and pre-trained encoder 308D receives an input embedding 318D that is a concatenation of aligned token sequence Base|B with edit sequence ABO.

The aggregation layer 320 combines the four encoder output states by means of the weighted sum transformation with learnable weights A, where $A=\Sigma_{i=0}^{N-1} w_i z_i$, where N is the number of neural encoder transformers, $w_i$ is a learnable weight, and $z_i$ is an encoder output. The aggregation of the encoder output states is passed to a linear classification layer 322 and a softmax function 324. The linear classification layer 322 computes the cross-entropy loss and computes output $O=W*A+b=\Sigma_{i=0}^{H-1} W_{ij} A_j + b_i$, where H is the number of hidden dimensions, $W \in \mathbb{R}^{H \times C}$, where C is the number of classes or resolution strategies, b is the bias. The softmax function 324 scales the output of the linear classification layer 322 into probabilities, $$\sigma(\vec{z})_i = \frac{e^{z_i}}{\sum_{j=1}^{C} e^{z_j}},$$

where $\vec{z}$ is the input vector to the softmax function made up of $(z_0, \ldots z_C)$, $z_i$ are the elements of the input vector, $e^{z_i}$ is the standard exponential function applied to each element in the input vector, C is the number of classes, and $\Sigma_{j=1}^{C} e^{z_j}$ is the normalization term. The output probability distribution 328 consists of a probability for each class c, where each class represents a particular resolution strategy.

For fine-tuning, each pre-trained model is initialized with the pre-trained parameters (e.g., weights and biases) and only the parameters of the linear classification layer and the aggregation layer are updated keeping the encoder transformer layers frozen. The pre-trained parameters of the encoder are the weights and biases of the cost function which are frozen. The parameters of the output classification layer are: D×C weight matrix, where D is the embedding dimension and C is the number of classes; and a C component bias vector. The parameters of the aggregation layer are four learnable weights defining relative contributions of each pretrained encoder.

Attention now turns to a more detailed description of the merge neural encoder transformer model.

Merge Neural Encoder Transformer Model

Figure 4:
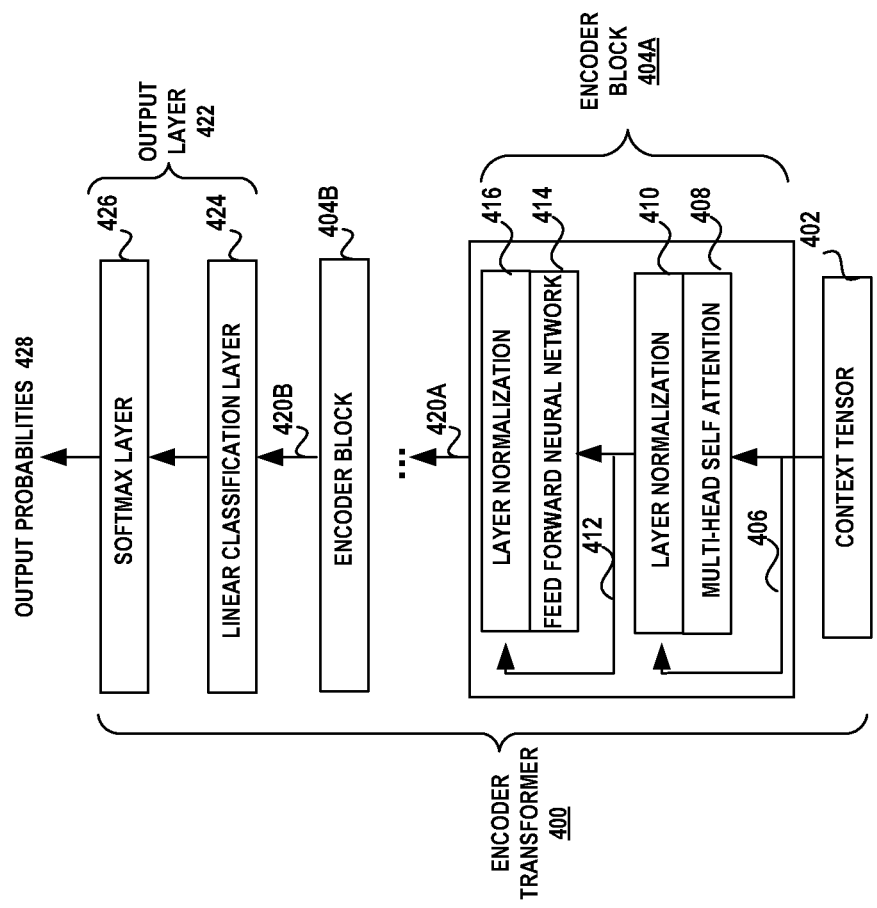
FIG. 4 is a schematic diagram illustrating an exemplary configuration of the neural encoder transformer model.

Turning to FIG. 4, there is shown an exemplary diagram of the neural encoder transformer model 400. The neural encoder transformer model 400 includes an input layer consisting of a context tensor 402, one or more encoder blocks 404A, 404B ("404"), and an output layer 422. The context tensor 402 includes embeddings of an input sequence.

An encoder block 404 consists of two layers. The first layer includes a multi-head self-attention component 408 followed by layer normalization component 410. The second layer includes a feed-forward neural network 414 followed by a layer normalization component 416. The context tensor 402 is input into the multi-head self-attention layer 408 of encoder block 404A with a residual connection to layer normalization 410. The output of the layer normalization 410 is input to the feed forward neural network 414 with another residual connection to layer normalization 416. The output of each encoder block is a set of hidden representations 420A, 420B ("420"). The set of hidden representations 420 are then sent through additional encoder blocks, if multiple encoder blocks exist.

Attention is used to decide which parts of the input sequence are important for each token/subtoken, especially when encoding long sequences. Attention mechanisms gather information about the relevant context of a given token/subtoken and then encode that context into a vector which represents the token/subtoken. It is used to identity the relationships between tokens in the long sequence while ignoring other subtokens that do not have much bearing on a given prediction.

The multi-head self-attention component 408 takes a context tensor 402 and weighs the relevance of each token/subtoken represented in the context tensor to each other by generating attention weights for each token/subtoken in the input embedding. In one aspect, the attention function is scaled dot-product attention which is described mathematically as follows:

$$\text{Attention}(Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one token/subtoken in a sequence, K is the vector representations of all tokens/subtokens in the sequence, and V is the vector representations of all the tokens/subtokens in the sequence.

The queries, keys and values are linearly projected h times in parallel with $d_v$ output values which are concatenated to a final value:

$$\text{MultiHead}(Q, K, V) = \text{Concat}(\text{head}_1, \ldots, \text{head}_h)W^O,$$

where $\text{head}_i = \text{Attention}(QW_i^Q, KW_i^K, VW_i^V)$ with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^O \in \mathbb{R}^{hd_v \times d_{model}}$.

In order to reduce the training time of the encoder transformer, layer normalization is used between the layers. The layer normalization component normalizes the inputs across the features. The mean and standard deviation is computed across the feature dimensions. There is a first layer normalization 410 that precedes the feed forward neural network 414 and a second layer normalization 416 that follows the feed forward neural network 414. The feed-forward neural network 414 processes each output encoding separately. The output of the top encoder block 420B is a set of attention vectors K and V 223 that represent the last hidden layer.

The output layer 422 consists of a linear layer 424 and a softmax layer 426. The linear layer 424 is a fully-connected neural network that projects the raw scores output by the last layer of the neural network into a logits vector. The softmax layer 426 applies the softmax function to the logits vector to compute a vector that represents the probability distribution of a list of potential outcomes 428.

Attention now turns to a discussion of the system and method for pre-training the neural encoder transformer model.

Pre-Training Neural Encoder Transformer Model

Figure 5:
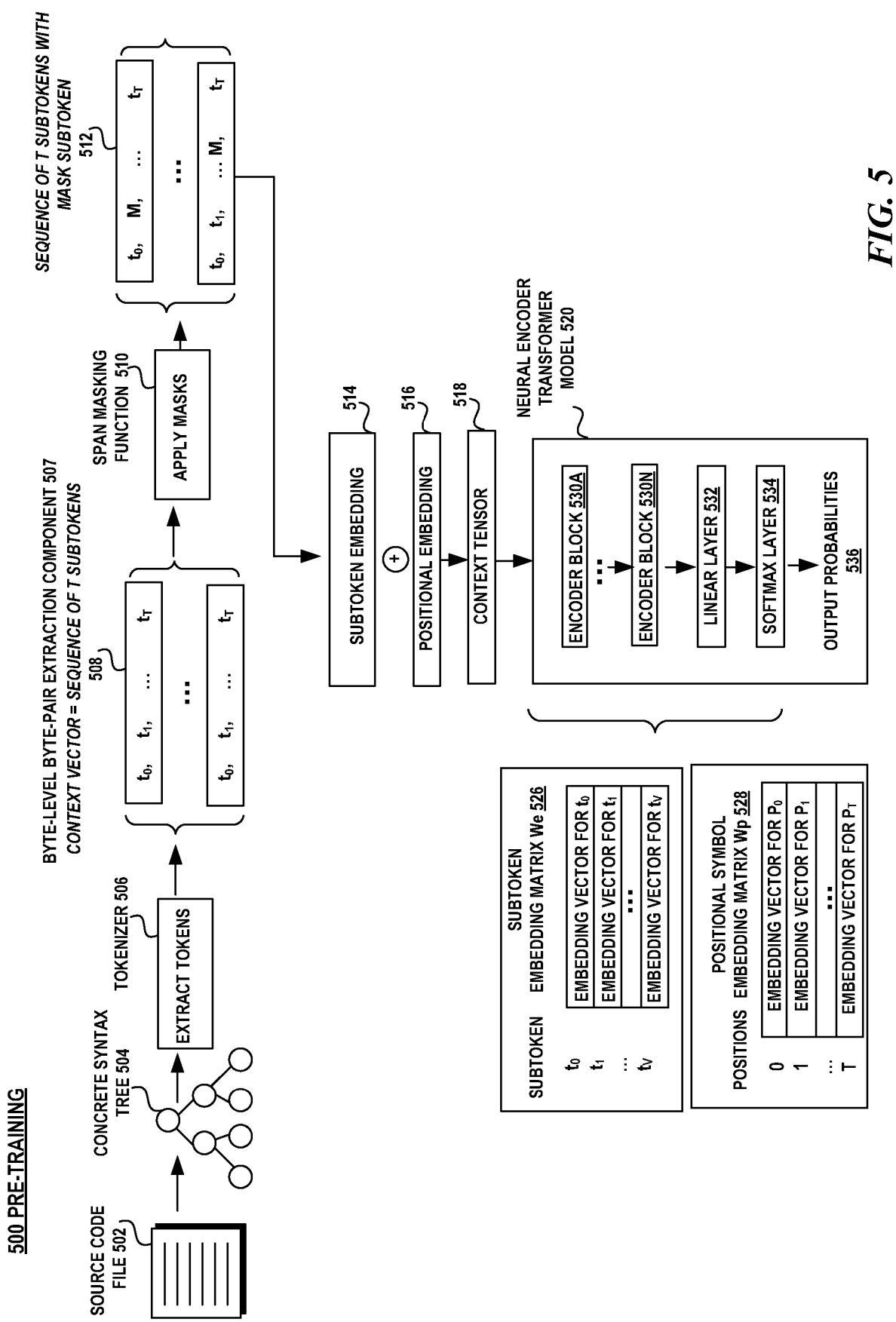
FIG. 5 is a schematic diagram illustrating the pre-training of the neural encoder transformer model.
Figure 6:
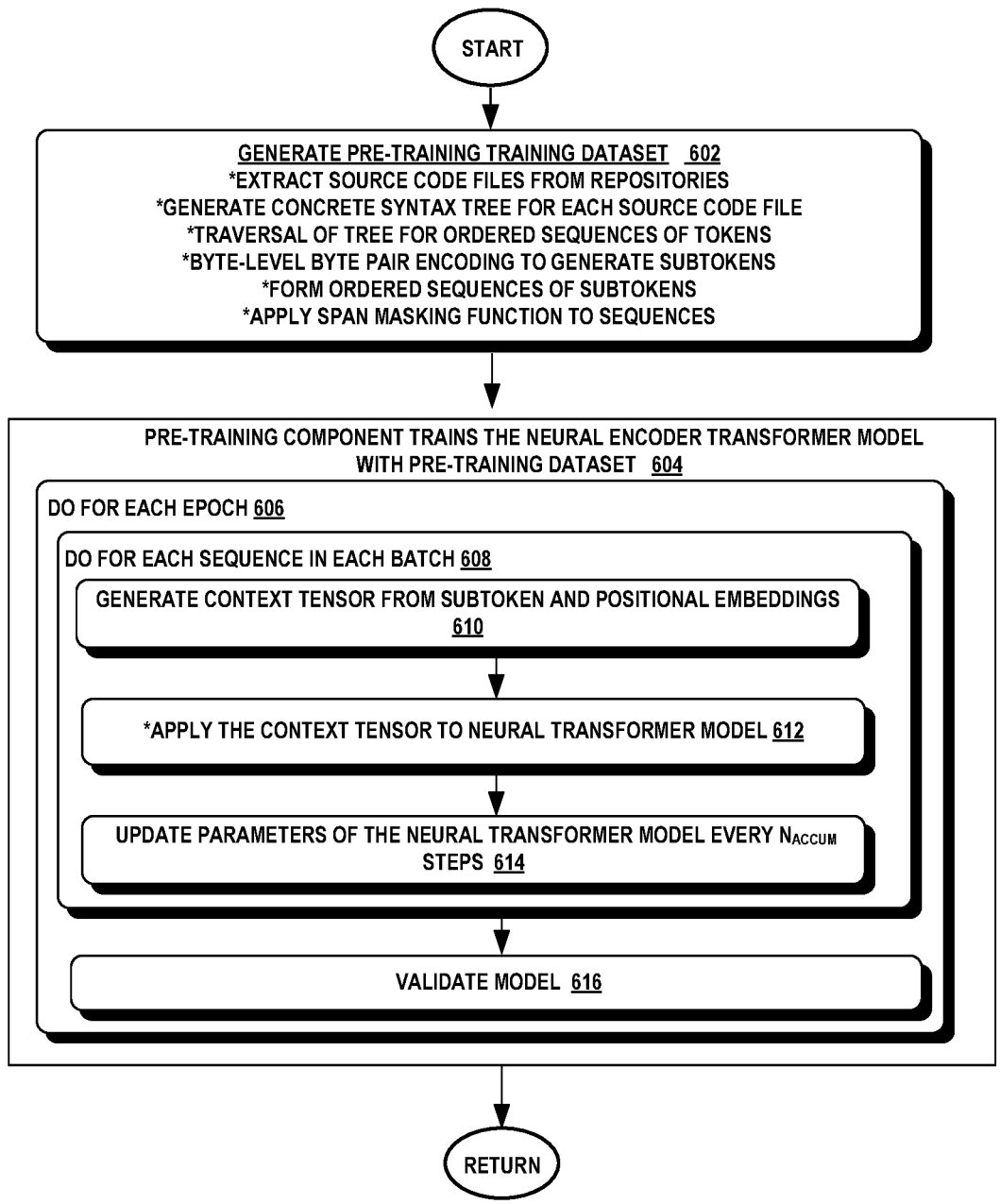
FIG. 6 is a flow diagram illustrating an exemplary method for pre-training the neural encoder transformer model.

FIG. 5 illustrates an exemplary system 500 and FIG. 6 illustrates an exemplary method 600 for pre-training the neural encoder transformer model. Turning to FIGS. 5 and 6, the pre-training component 306 generates a pre-training dataset 304 from a corpus of unlabeled source code programs or files 602. The pre-training dataset 304 may include source code files 602 from different programming languages. This is referred to as unsupervised learning since the model draws inferences from the input data without labeled responses. The pre-training component 306 extracts selected source code files 602 from various source code repositories. (Collectively, block 602).

The pre-training component 306 transforms each of the selected source code files into a concrete syntax tree 504. The concrete syntax tree 504 represents the source code text in a parsed form. The concrete syntax tree 504 may also be a parse tree. A concrete syntax tree 504 represents the syntactic structure of a program in a hierarchical or tree structure. The concrete syntax tree 504 is an n-ary tree data structure that includes nodes that represent a construct in the grammar of the programming language of a program. The concrete syntax tree 504 includes one root node, multiple internal nodes, and multiple terminal nodes. The terminal nodes represent the tokens. A token is a symbol that represents an operand or an operator. The concrete syntax tree 504 differs from an abstract syntax tree where the terminal nodes represent operands. (Collectively, block 602).

The pre-training component 306 uses a tokenizer 506 to extract tokens from the concrete syntax tree 604. The frequently-used elements in a programming language are encoded into tokens and the less frequently-occurring elements are encoded into combinations of characters referred to as subtokens. For simplicity, the term subtoken shall include tokens and subtokens. (Collectively, block 602).

The pre-training component 306 uses a byte-level byte-pair extraction component 507 to generate T-ordered sequences of subtokens 508. A denoising function, such as a span masking function 510, is then applied to each sequence 508 that randomly masks out a subset of subtokens and the masked span of subtokens is replaced with a mask subtoken, M, as noted above. (Collectively, block 602).

Neural transformer models are trained iteratively, making multiple passes over the pre-training dataset before converging to a minimum. An epoch represents the entire training dataset passed forwards and backwards through the neural transformer block once. Since the training dataset is very large, it is partitioned into smaller batches. The training is iterative and the entire dataset is passed through the neural transformer in multiple iterations. Each training iteration includes forward propagation, loss calculation, backpropagation steps followed by updating the weights. The training dataset is partitioned into batches with each batch of sequences running through the training process. (Collectively, block 604).

The neural transformer model has multiple blocks and layers so that more detailed relationships within the data are learned as well as how the features interact with each other on a non-linear level. The model architecture, training procedure, data normalization and vocabulary encoding procedures are hyperparameters that are tailored to meet a particular objective. The values of the hyperparameters influence how the parameters are learned. (Collectively, block 604).

In one aspect, the hyperparameters may include the following: (1) subtoken and position embedding layers of dimensions: 30000×768, and 1024×768 respectively; (2) the configuration of the neural transformer model with twelve encoder blocks and twelve decoder blocks; (3) for the training procedure: denoising auto-encoder, with a masked language modeling pre-training objective; the sequence length of 1024 symbols; a mini-batch size of 8; the gradient accumulation steps for each weight update is 8; the Adam stochastic optimization procedure is used to train the feed forward neural network; and an inverse square root learning rate schedule with the base learning rate of 0.0001; a warmup period of 5000 update steps; local gradient accumulation with a frequency of four update steps; (4) the data normalization procedure: normalize all string and numerical literals, keeping the ten most frequent; and (5) the vocabulary encoding procedure: byte-level byte-pair encoding, preserve the ten most frequent string and numerical literals encoding them as a single token during byte-level byte-pair encoding procedure; and introduce special control flow tokens to denote end-of-line, end-of-file, end-of-method, dedent, and indent symbols. (Collectively, block 604).

For each sequence of each batch in each epoch (blocks 606, 608), the T-ordered sequences of subtokens are then mapped into numeric vectors and then into respective subtoken embeddings 514 and positional embeddings 516 (block 610). An embedding is a learned representation for the text-based subtokens where subtokens that have a common meaning have a common representation. An embedding is a mapping of discrete categorical variables to a vector of continuous numbers. There is an embedding for each subtoken in the vocabulary 526 and a corresponding positional embedding 528. The subtoken embedding matrix 526 represents the learned representation for the subtokens of the vocabulary. The neural encoder transformer model does not read each subtoken sequentially and as such, has no knowledge of the subtoken's position in a sequence without additional position information. The positional embedding matrix 528 is used to embed position information about a subtoken's position in a sequence into the neural encoder transformer model 520.

Initial values are generated for the subtoken embedding 514 and positional embeddings 516 of each sequence which are then used to form a context tensor 518. Thereafter, the neural encoder transformer model 520 learns the values for each embedding. Upon the completion of the pre-training phase, the embeddings for each subtoken and the positional embeddings are saved into respective matrices 526, 528 for later use. There is a subtoken embedding matrix, We, 526 that contains an embedding vector for each subtoken $t_i$, i=0 . . . V, and a positional embedding matrix, Wp, 528 that contains an embedding vector $P_j$, j=0 . . . T, for each position, where V is the size of the vocabulary and T is the length of the subtoken sequence. (Collectively, block 610).

The first encoder block 530A of the neural encoder transformer model 520 takes the context tensor 518 as input and passes it through the multiple layers of multi-head attention, layer normalization, feed-forward neural network, and layer normalization to finally produce a set of hidden representations If there are additional encoder blocks, the output of each encoder block is passed onto the next encoder block with the output of the last encoder block producing the set of hidden representations. (Collectively, block 612).

The feed forward neural networks in the encoder blocks 530A, 530B are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a categorical cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation through time (BPTT) algorithm may be used to update the weights. (Collectively, block 612).

At the completion of each batch, the parameters of the neural transformer model are updated at a preconfigured frequency denoted as Naccum. Naccum is a gradient accumulation frequency and in one aspect has a value of 4. The parameters include the subtoken embeddings and the positional embeddings which are stored in a respective embedding matrix. (Collectively, block 614).

Next, the neural transformer model with attention is validated. Before the neural transformer model with attention is trained, a set of hyperparameters is selected randomly and then tuned to achieve a desired performance. The neural transformer model with attention is tested using a validation dataset to determine the appropriate hyperparameters settings to achieve a desired goal. When the desired goal is not achieved, one or more hyperparameters are adjusted and the training is repeated until the target goal is achieved. Perplexity on the validation set is calculated to validate the performance of the model with respect to the learning the masked out original text. (Collectively, block 616).

Attention now turns to a description of an exemplary method of fine-tuning the pre-trained neural encoder transformer model.

Fine-Tuning the Neural Encoder Transformer Model

Figure 7:
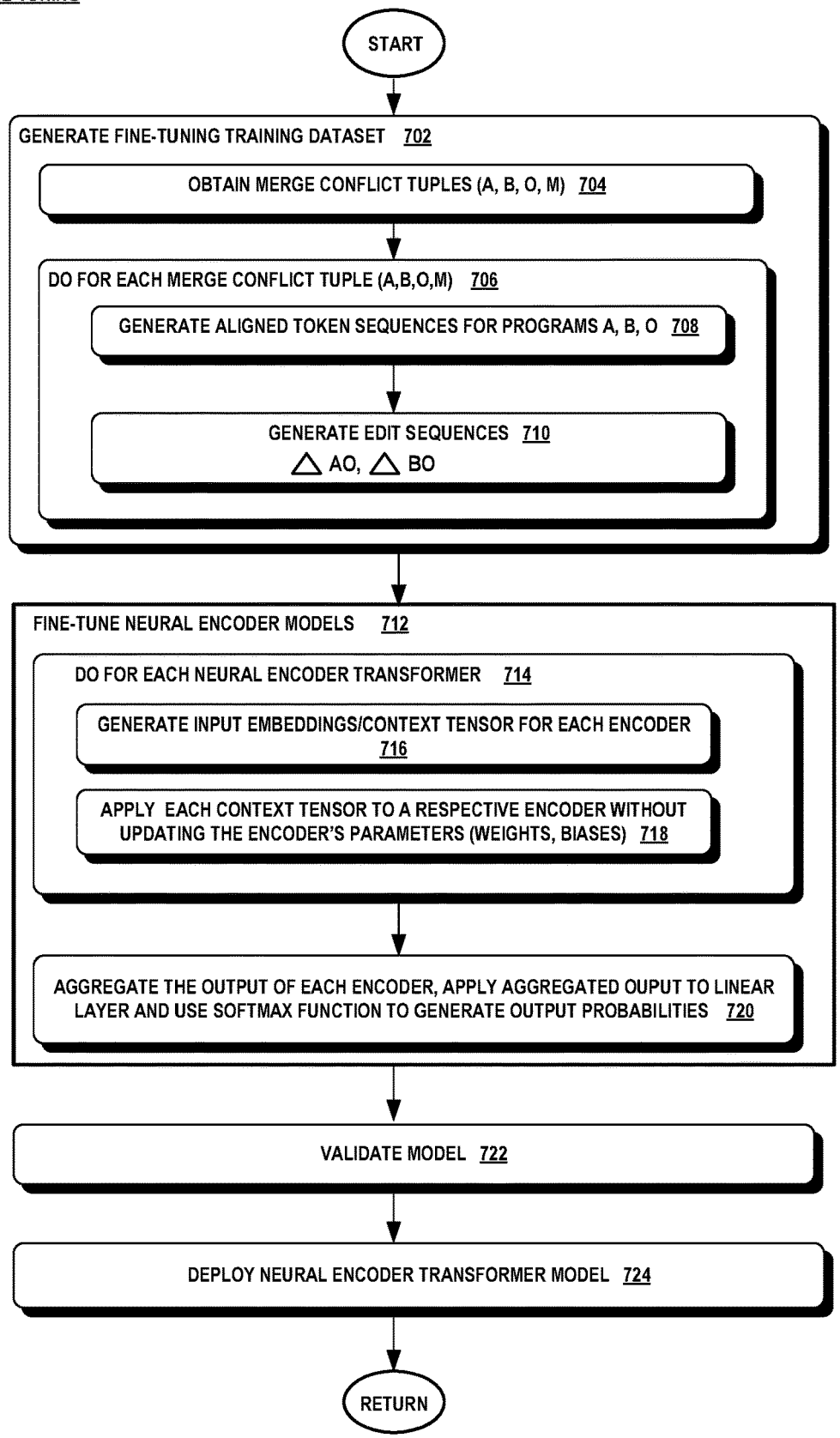
FIG. 7 is a flow diagram illustrating an exemplary method for fine-tuning the neural encoder transformer models.

FIG. 7 represents an exemplary method 700 for fine-tuning the pre-trained model with merge conflict tasks. Initially, the fine-tuning dataset is generated (block 702). For a three-way merge, the fine-tuning dataset includes four aligned token sequences and two edit sequences. However, it should be noted that the techniques described herein are not constrained to a three-way merge and is used herein for illustration purposes.

The pre-training component obtains merge conflict tuples (A, B, O, M) from various sources, such as version-controlled source code repositories, where M is the developer-resolved merge program (block 704). For each merge conflict tuple (A, B, O, M) (block 706), the programs are parsed into a concrete syntax tree from which aligned token sequences (i.e., A|Base, Base|A, Base|A, Base|B) are generated for programs A, B, and O as described above with respect to FIG. 2 (block 708). In addition, the edit sequences are generated as well as described above with respect to FIG. 2 (i.e., ΔAO, ΔBO) (block 710).

For each merge conflict tuple (A, B, O), there are four input embeddings and each input embedding is applied to a particular pre-trained encoder. As shown in FIG. 3, pretrained encoder 308A receives an input embedding composed of the aligned token sequence A|Base and edit sequence ΔAO, pre-trained encoder 308B receives an input embedding composed of the aligned token sequence Base|A and edit sequence ΔAO, pre-trained encoder 308C receives an input embedding composed of the aligned token sequence B|Base and edit sequence ABO, and pre-trained encoder 308D receives an input embedding composed of the aligned token sequence Base|B and edit sequence ABO. A respective input embedding is applied to a respective pre-trained encoder in a similar manner explained above with respect to FIG. 5. However, the weights computed by the encoder are not updated. (Collectively, blocks 712, 714, 716, 718).

The output tensor of each encoder is aggregated at the aggregation layer and the aggregated tensor is passed on to the linear classification layer and then the softmax function to generate the output probabilities. The parameters of the aggregation layer and the linear classification layer are updated (block 720).

Upon completion of the fine-tuning process, the model is validated (block 722) and then deployed in a target application (block 724).

Attention now turns to a discussion of the use of the neural encoder transformer in predicting a resolution strategy for a merge conflict.

Inference Process Using Neural Encoder Transformer

Figure 8:
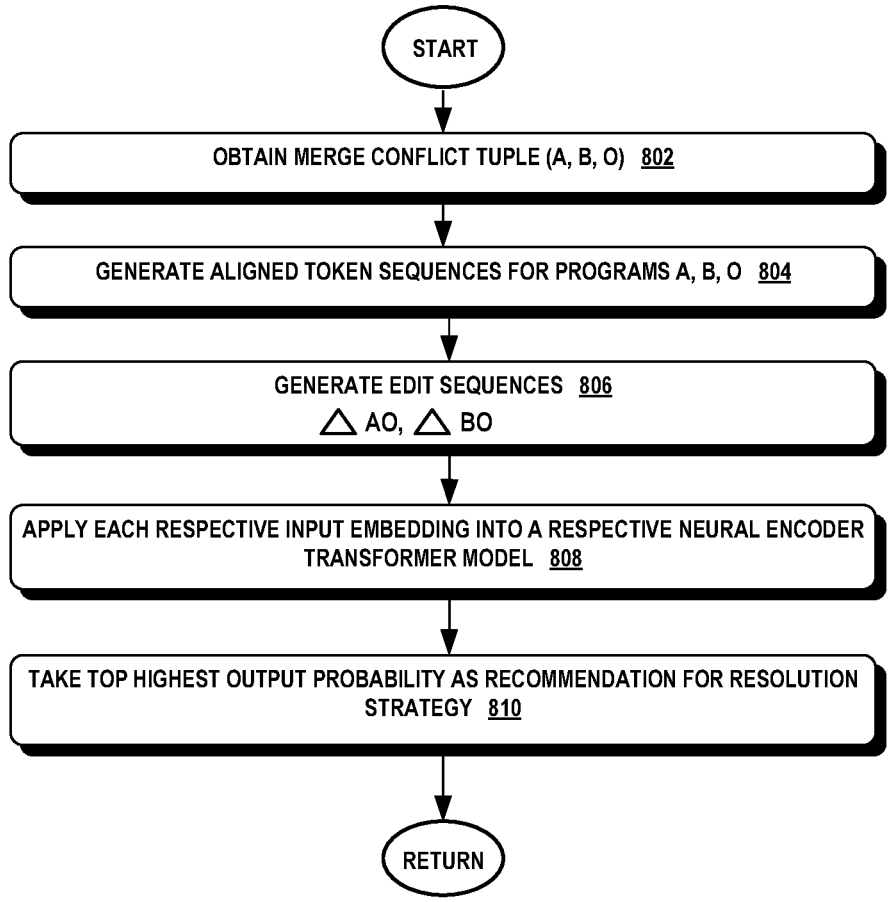
FIG. 8 is a flow diagram illustrating an exemplary method for performing a program merge using the neural encoder transformer system.
Figure 9:
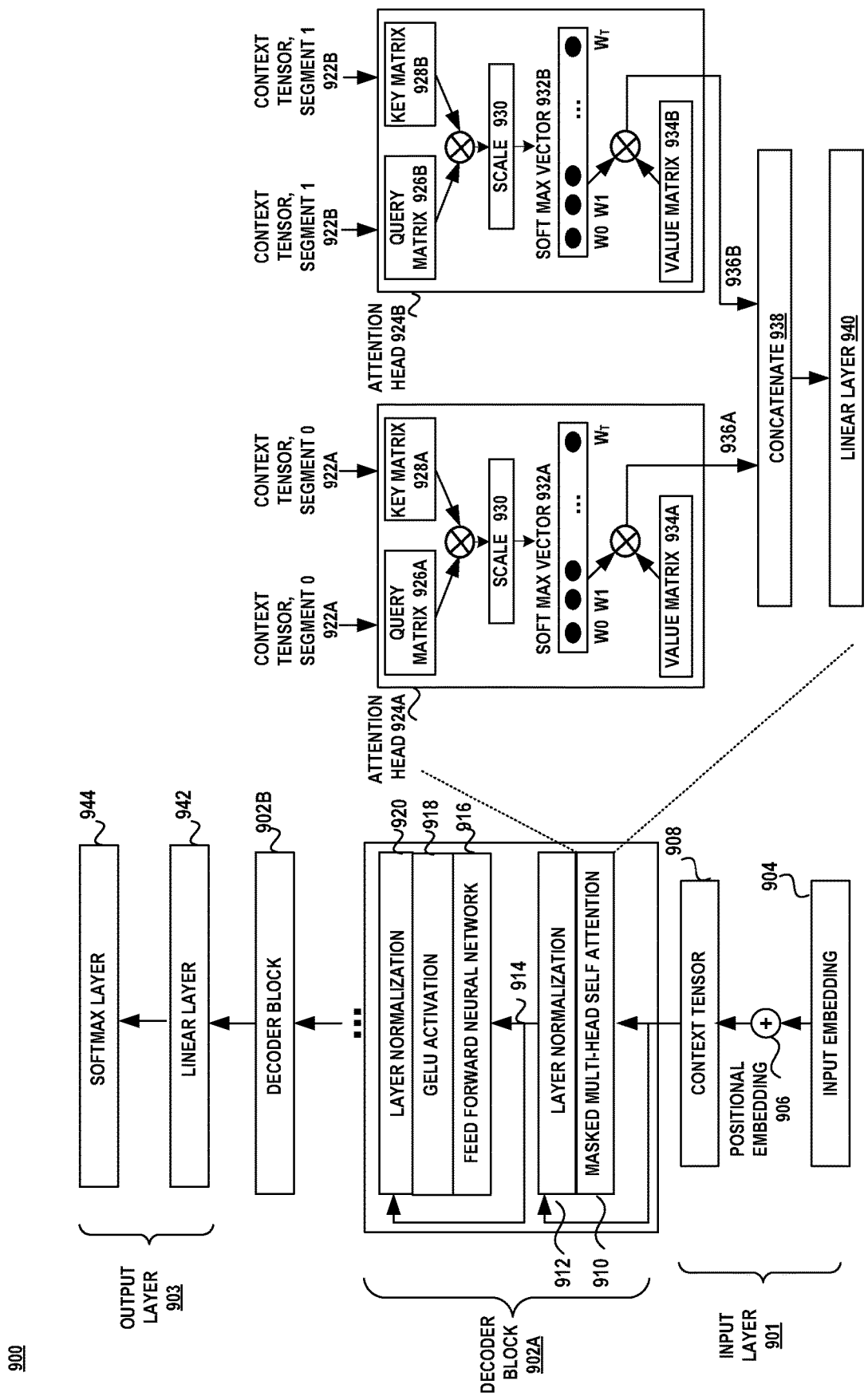
FIG. 9 is a schematic diagram illustrating an exemplary configuration of the neural decoder transformer model.

Turning to FIG. 8, there is shown an exemplary method 800 for predicting a merge resolution strategy. A request to resolve a merge conflict is received and the corresponding merge conflict tuple (A, B, O) is obtained. In one aspect, the neural encoder transformer system may be part of a version-controlled source code repository. The source code repository may detect a merge conflict and invoke the neural encoder transformer system to generate a resolution strategy. The programs involved in the merge conflict are obtained from their respective source code repositories (Collectively, block 802).

The sequence generator 220 generates the aligned token sequences for programs A, B, and O (block 804) and the edit sequences (block 806). Embeddings of the input sequences are formed from the aligned token sequences and edit sequences and applied to a respective neural encoder transformer model (block 808).

An output distribution is generated for each of the classes. In one aspect, the class having the highest output probability is then selected as the resolution strategy. In another aspect, the top k classes having the highest output probabilities are selected as proposed resolution strategies. The resolution strategy is provided to a developer to assist the developer in formulating a merge program (Collectively, block 810).

Attention now turns to a discussion of the neural decoder transformer system.

Neural Decoder Transformer Architecture

In one aspect, the decoder neural transformer model 900 includes an input layer 901, one or more decoder blocks 902A, 902B, and an output layer 903. A decoder block 902A, 902B consists of two layers. The first layer includes a masked self-attention component 910 followed by a layer normalization component 912. The input to the masked multi-head self-attention component 910 has a residual connection to layer normalization 912. The output of layer normalization 912 is input into the feed forward neural network 916 with a residual connection to layer normalization component 920. The output of the feed forward neural network 916 is input into a Gaussian Error Linear Unit (GELU) activation layer 333 and a layer normalization component 920.

The decoder blocks 902 are stacked so that the output of one decoder block is input into another decoder block. The input to the first decoder block 902A is formed in a context tensor 908 and composed of an input embedding 904 concatenated with its positional embedding 906. A decoder block 902 predicts each subtoken $t_i$ in the target language one-by-one at each time step conditioned on all previously-generated target subtokens $t_1, \ldots t_{i-1}$. A decoder block 902 consists of three layers.

Attention is used to decide which parts of the input sequence are important for each subtoken, especially when decoding long sequences since the encoder is limited to encoding a fixed-size vector. Attention mechanisms gather information about the relevant context of a given subtoken and then encode that context into a vector which represents the subtoken. It is used to identity the relationships between subtokens in the long sequence while ignoring other subtokens that do not have much bearing on a given prediction.

The neural decoder transformer model takes the sequence x as the input and then converts the sequence into input vectors $H^0$. For each subtoken, a context tensor is formed from its corresponding subtoken and positional embeddings. The neural decoder transformer model applies N decoder blocks over the context tensor to produce a contextual representation, $H^n=\text{decoder}_n(H^{n-1})$, $n \in 1, N|$. Each decoder block 302 applies a multi-headed self-attention operation followed by a feed forward layer over the input $H^{n-1}$ in the n-th layer. At the n-th decoder block, the output $H^n$ of the multi-headed self-attention component is computed as:

$$Q_i = H^{n-1} W_i^Q, K_i = H^{n-1} W_i^K, V_i = H^{n-1} W_i^V,$$

$$\text{head}_i = \text{softmax}\left((Q_i K_i^T) / \sqrt{d_k} + M\right) V_i$$

$$H^n = [\text{head}_1; \ldots ; \text{head}_n] W_n^O$$

where the previous layer's output $H^{n-1} \in \mathbb{R}^{|X| \times dh}$ is linearly projected to a triplet of queries (Q), keys (K), and values (V) using model parameters $W_i^Q, W_i^K, W_i^V \in \mathbb{R}^{dh \times dk}$, respectively, where u is the number of heads, $d_k$ is the dimension of a head, and $W_n^O \in \mathbb{R}^{dh \times dh}$ is the model parameters, $M \in \mathbb{R}^{|X| \times |X|}$ is a mask matrix, where $M_{ij}$ is 0 if i-th token is allowed to attend j-th token, otherwise $-\infty$.

The masked multi-head self-attention component 910 receives the input embeddings as key (K), value (V) and query (Q) inputs. The output of the masked multi-head self-attention layer 910 is a weighted sum of the values, where each weight is computed as a compatibility score of a query given the corresponding key. The masked multi-head self-attention component 910 uses a causal mask, forbidding input embedding i to attend to an input embedding j having j>i, i.e. from the future. Each self-attention head 924A, 924B performs the scaled dot-product attention operation: Attention(Q,K,V)=softmax($Q*K^T/\sqrt{d_k}$)*V, where $d_k$ is the dimension of the keys and queries.

In one aspect of the disclosure, the masked multi-head self-attention layer 910 consists of multiple attention heads, such as 924A, 924B. The self-attention heads run through the scaled dot product attention, Attention (Q,K,V), multiple times in parallel. Each attention head 924A, 924B operates on a portion of the context tensor. Attention head 924A operates on a first segment 922A and attention head 924B operates on a second segment 922B. Each attention head 924A, 924B operates on an input sequence $x=(x_1, \ldots, x_n)$ of n elements and computes a new sequence of the same length z=($z_1$, ..., $z_n$). Each output element $z_i$ is computed as a weighted sum of linearly transformed input elements:

$$z_i = \sum_{j=1}^{n} \alpha_{ij}(x_j W^V).$$

Each weight coefficient is computed using the softmax function as follows:

$$\alpha_{ij} = \frac{\exp e_{ij}}{\sum_{k=1}^{n} \exp e_{ik}},$$

where $e_{ij}$ is the scaled dot product $$e_{ij} = \frac{(x_i W^Q)(x_j W^K)^T}{\sqrt{d_Z}},$$

where $d_Z$ is the dimension of z.

The input into each attention head 924A, 924B consists of a query matrix 926A, 926B and a key matrix 928A, 928B, both of dimension, T×$d_x$, where T is the code sequence length and $d_x$ is the embedding dimension. A dot product is generated from a respective query matrix 926A, 926B with all the keys from a respective key matrix 928A, 928B which is scaled by dividing each element of the resulting matrix by the square root of the segment or head size. The softmax function is applied to the scaled dot product to obtain the weights, $W_0 \ldots W_T$, 932A, 932B. The value matrix 934A, 934B is multiplied by the softmax matrix 932A, 932B producing matrices 936A, 936B. The resulting values 936A, 936B are then concatenated 938 and then linearized 940. The concatenation layer 938 takes T×$d_v$ dimensional key matrices from each attention head to form a T×$d_v$ dimensional matrix. The linear layer 940 takes the output of the concatenation layer 938 and applies a linear transformation according to: output=input·$W^T$+b, where the input is a T×$d_v$ matrix, W is a $d_v$×$d_v$ dimensional matrix, b is a T×$d_x$ dimensional matrix, and output is the T×$d_x$ dimensional matrix obtained as a result of matrix multiplication and addition. Layer normalization 912 is then applied to the output of the masked self-attention layer 910 which is then forwarded to the feed forward network layer 916.

The GELU activation 918 is an activation function that scales the output of the feed-forward neural network for the layer normalization layer 920. The GELU is defined as follows: GELU(x)=0.5x (1+tan h($\sqrt{2/\pi}$(x+0.044715$x^3$))). The GELU activation function 918 is used to achieve faster and better convergence that a sigmoid function and to avoid the vanishing gradient problem.

A layer normalization component 912, 920 is used between the layers in order to normalize the inputs across the features. The training of a neural network is a time-consuming task and layer normalization is used to reduce the training time by normalizing the inputs across the features.

Attention now turns to a description of training the neural decoder transformer model.

Training the Neural Decoder Transformer Model

Figure 10:
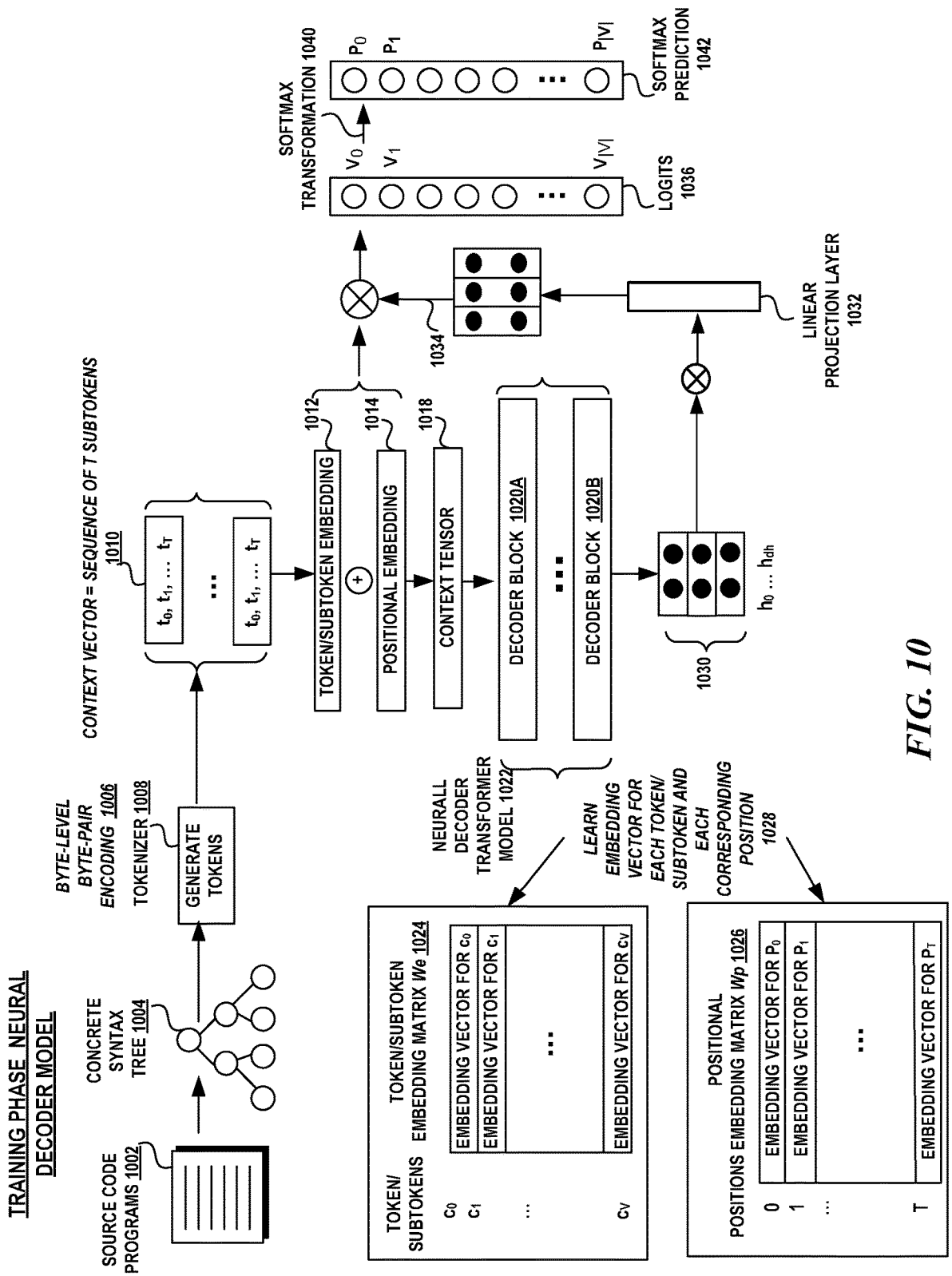
FIG. 10 is a schematic diagram illustrating the training of the neural decoder transformer model.
Figure 11:
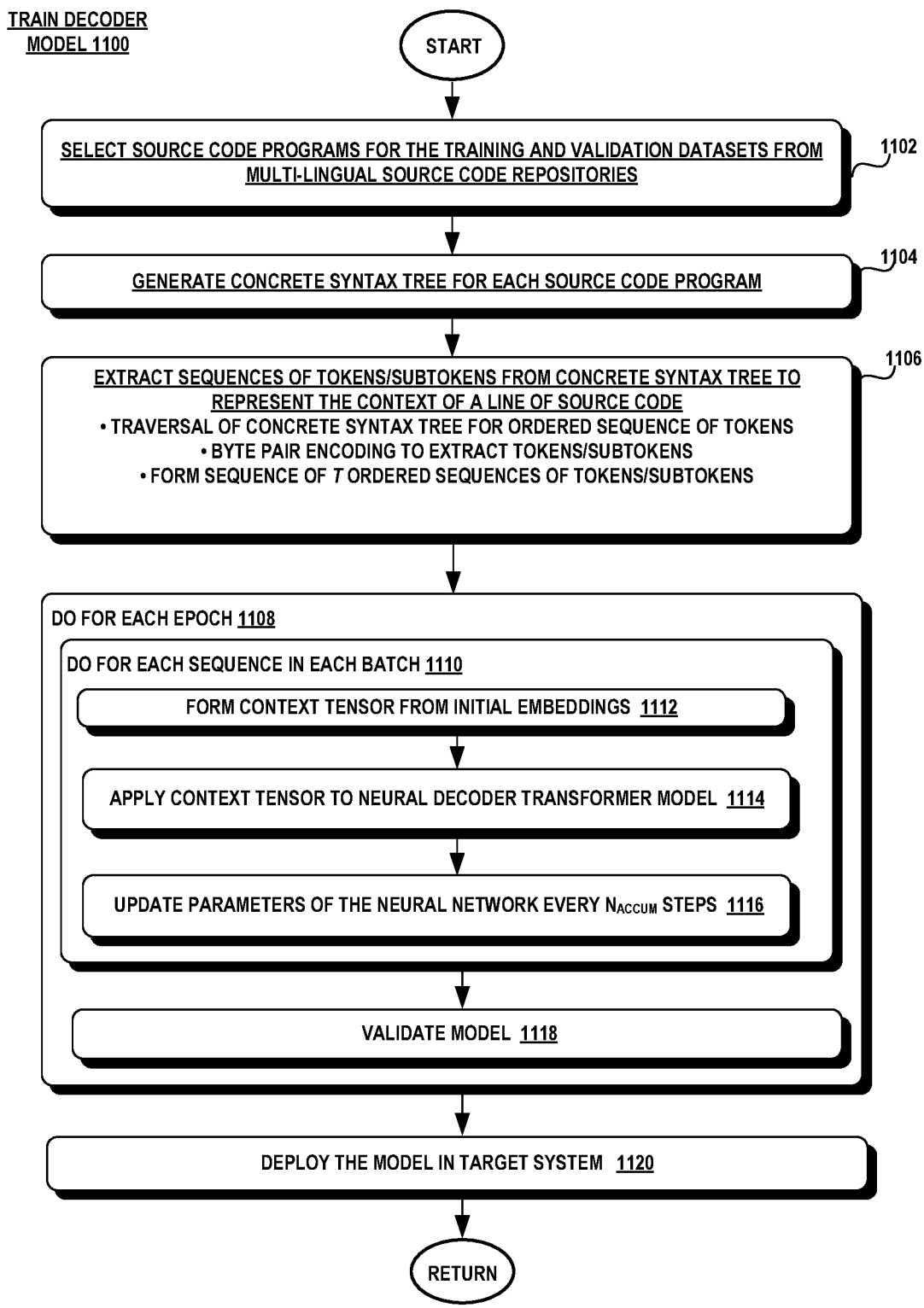
FIG. 11 is a flow diagram illustrating an exemplary method for training the neural decoder transformer model.

FIG. 10 illustrates the training phase 1000 of the neural decoder transformer system and FIG. 11 depicts an exemplary method 1100 for training the neural decoder transformer system. A decoder-only neural transformer model with attention is trained on a large corpus of unsupervised multi-lingual source code programs 1002. Each source code program 1002 in the training dataset does need not be written in the same programming language. The training dataset may be composed of numerous source code programs, each of which may be written in a different programming language. (Collectively, block 1102).

Source code programs are extracted from various source code repositories for use as the training and validation datasets. Each selected source code program 1002 is parsed into a concrete syntax tree 1004 and traversed to extract an ordered sequence of tokens 1008 (block 1104).

The frequently-used elements in a programming language are encoded into tokens and the less frequently-occurring elements are encoded into combinations of characters referred to as subtokens. This reduces the need to store a large vocabulary and provides better accuracy for out-of-vocabulary tokens. For simplicity, the term subtoken shall include tokens and subtokens. (Collectively, block 1106).

In one aspect, byte-level byte-pair encoding 1006 is used as the tokenizer 1008. Byte pair encoding is used to build a vocabulary of tokens/subtokens. Although its name uses the word "byte", byte pair encoding operates on Unicode code points and not byte sequences. This encoding technique partitions less-occurring tokens into subtokens and the more frequently occurring tokens are left intact. (Collectively, block 1106).

The tokens and subtokens of each line of source code are then aggregated into an ordered sequence of token/subtokens consisting of T token/subtokens 1010. In one aspect, T is 1024 tokens with each sequence consisting of 1024 token/subtokens and representing a particular context of the source code program. The sequences from the various source code programs are then input to train the model. (Collectively, block 1106).

Neural networks are trained iteratively, making multiple passes over the training dataset before converging to a minimum. An epoch represents the entire training dataset passed forwards and backwards through the neural network once. Since the training dataset is very large, it is partitioned into smaller batches. The training is iterative and the entire dataset is passed through the neural network in multiple iterations. Each training iteration includes forward propagation, loss calculation, backpropagation steps followed by updating the weights.

The neural network has multiple layers so that more detailed relationships within the data are learned as well as how the features interact with each other on a non-linear level. The model architecture, training procedure, data normalization and vocabulary encoding procedures are hyperparameters that are tailored to meet a particular objective. The values of the hyperparameters influence how the parameters are learned.

The neural decoder transformer model has multiple blocks and layers within each block so that more detailed relationships within the data are learned as well as how the features interact with each other on a non-linear level. The model architecture, training procedure, data normalization and vocabulary encoding procedures are hyperparameters that are tailored to meet a particular objective. The parameters of the model are the values of the model, such as the weights (e.g., K, V, We, Wp) and biases. The hyperparameters influence the way the model is built and how the parameters are learned.

In one aspect, the hyperparameters may include the following: (1) token/subtoken and position embedding layers of dimensions: 30000×768, and 1024×768 respectively; (2) twelve decoder blocks, with each block consisting of masked self-attention, feedforward, and layer normalization layers; (3) for the training procedure: auto-regressive, with a cross-entropy loss optimization objective; the sequence length is 1024 tokens/subtokens; the mini-batch size is 8; the gradient accumulation steps for each weight update is 8; the Adam stochastic optimization procedure is used to train the neural network; and the learning rate is 0.0001; (4) the data normalization procedure: normalize all string and numerical literals, keeping the ten most frequent; and (5) the vocabulary encoding procedure: extract joint subtoken vocabulary from the multi-lingual code corpus using byte-pair encoding, preserve the ten most frequent string and numerical literals encoding them as a single token during byte-pair encoding procedure; and introduce special control flow tokens to denote end-of-line, end-of-file, decent, and indent symbols.

The training dataset is partitioned into batches with each batch of sequences running through the training process. For each sequence of each batch in each epoch (blocks 1108, 1110), the T-ordered sequences are initially transformed into numeric vectors and then embeddings. An embedding is a mapping of discrete categorical variables to a vector of continuous numbers. There is a token/subtoken embedding 1012 and a positional embedding 1014 for each sequence. The token/subtoken embeddings represent the tokens and/or subtokens in a sequence and the positional embeddings represents the order of a token/subtoken in a sequence.

Initially, random values are used for the initial values of each token/subtoken embedding and positional embedding. Thereafter, the neural decoder transformer model 1022 learns the values for each embedding 1028. Upon the completion of the training phase, the embeddings for each token/subtoken and the position embeddings are saved into respective matrices 1024, 1026 for later use in the interference phase. There is a token/subtoken embedding matrix, $W_e$, 1024 that contains an embedding vector for each token/subtoken $C_i$, i=0 . . . V, and a positional embedding matrix, $W_p$, 1026 that contains an embedding vector $P_j$, j=0 . . . T, for each position, where V is the size of the vocabulary and T is the length of the token/subtoken sequence.

Each token/subtoken embedding 1012 and its corresponding positional embedding 1014 are combined to form a context tensor 1018. A tensor is a mathematical object that has indices and components that follow certain transformation rules. The tensor is a partially defined computation. It is a generalization of vectors and matrices and represented as an n-dimensional array. The tensor in this instance represents a context of a source code program. The size of the context tensor 1018 is T×size of the embedding vector (e.g., embedding size), where T is the length of the token/subtoken sequence. (Collectively, block 1112).

Each context tensor is applied to the layers of the neural decoder transformer. The token/subtoken embeddings 1024 are learned together with the parameters of the neural decoder transformer model 1022. The output hidden state of neural decoder transformer model 1030 is then multiplied by the linear projection layer A 1032. The linear projection layer or matrix A is defined as $A=a_{ij} \in R^{dh \times dx}$. The hidden state vector, $h_T \in R^{dh}$ 1030, encodes information learned by neural decoder transformer model 1022 from the context tensors 1018. Finally, a probability distribution for each token/subtoken $P_{|V|}$ 1042 is generated by getting the unnormalized logits predictions 1036 as $y_k = \Sigma_j l_{kj} l_j^{pred} + b_k$, where $b_k$, k=0 . . . |V|−1 is the bias vector, and then normalizing them using softmax transformation 1040. (Collectively, block 1114).

At the completion of each batch, the parameters of the neural decoder transformer model are updated at a preconfigured frequency denoted as Naccum. Naccum is a gradient accumulation frequency and in one aspect has a value of 4. The parameters include the subtoken embeddings and the positional embeddings which are stored in a respective embedding matrix. (Collectively, block 1116).

Next, the neural transformer model with attention is validated. Before the neural transformer model with attention is trained, a set of hyperparameters is selected randomly and then tuned to achieve a desired performance. The neural transformer model with attention is tested using a validation dataset to determine the appropriate hyperparameters settings to achieve a desired goal. When the desired goal is not achieved, one or more hyperparameters are adjusted and the training is repeated until the target goal is achieved. Perplexity on the validation set is calculated to validate the performance of the model with respect to the learning the masked out original text. (Collectively, block 1118).

Upon validation of the model, the model is deployed in a target system (block 1120).

Inference Process of the Neural Decoder Transformer Model

Figure 12:
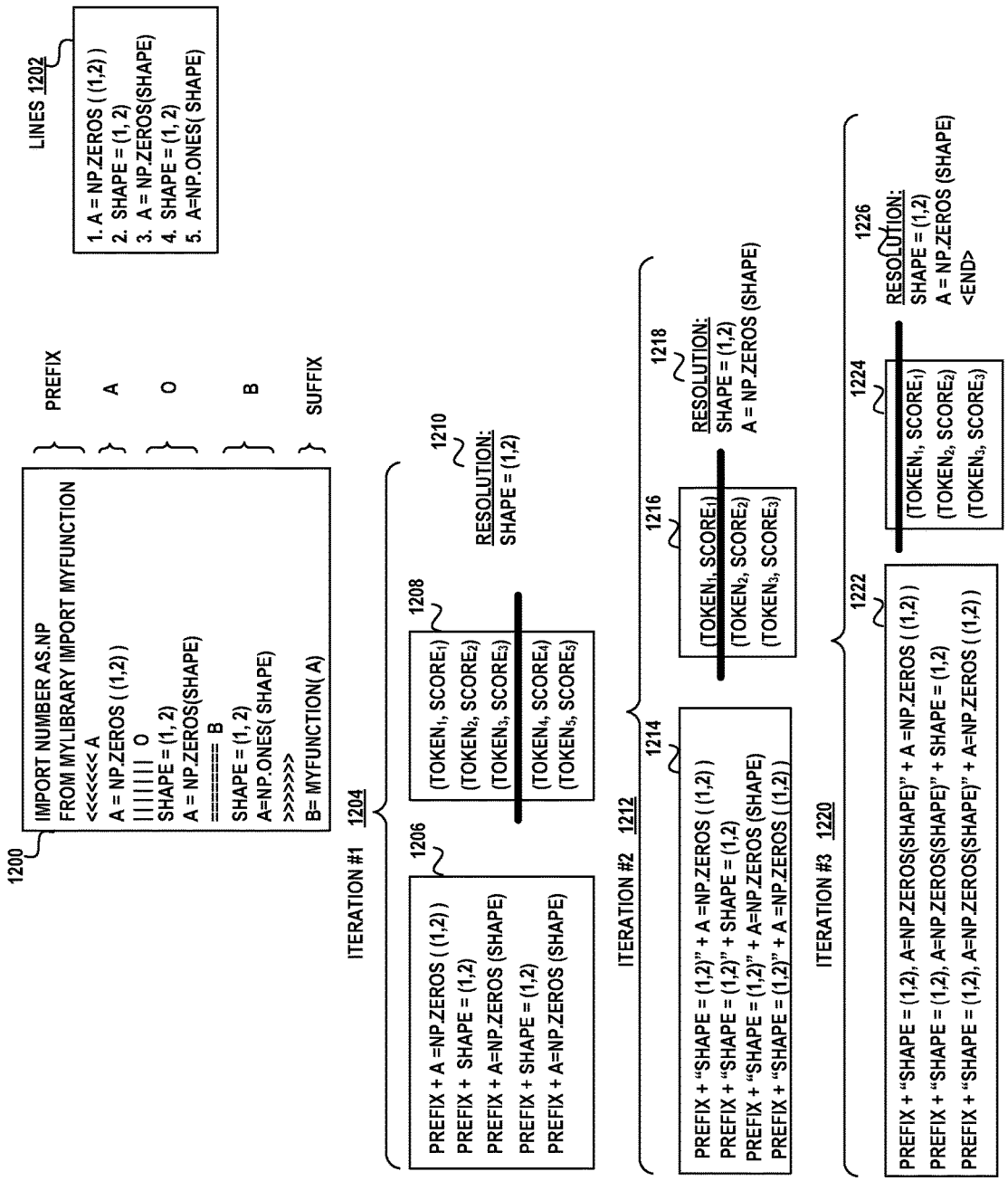
FIG. 12 is schematic diagram illustrating steps used in generating a merge resolution for an exemplary merge conflict.
Figure 13:
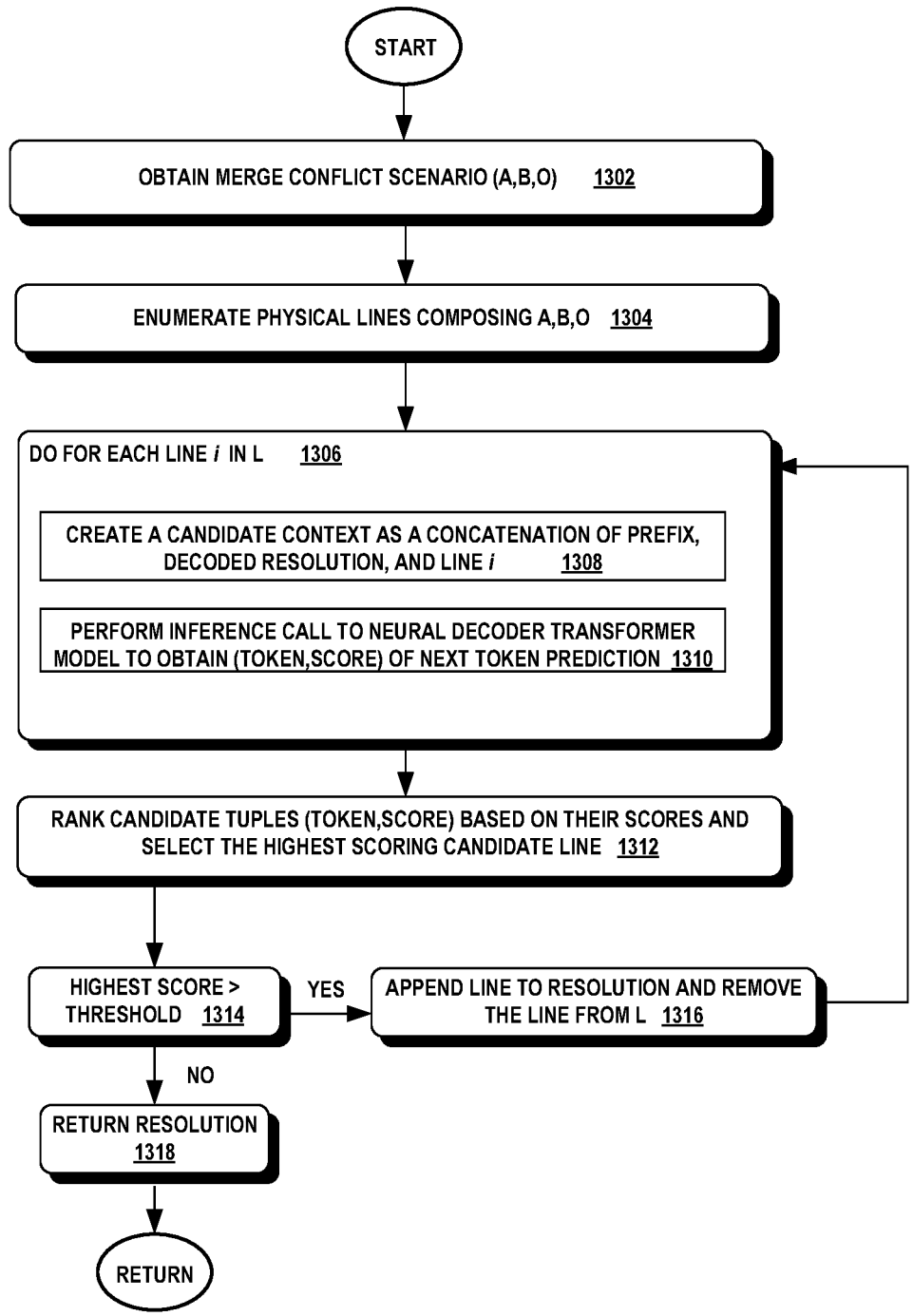
FIG. 13 is a flow diagram illustrating an exemplary method for generating a merge resolution using the neural decoder transformer model.

Attention now turns to a discussion of the inference process of the neural decoder transformer model. FIG. 12 illustrates the inference process through an exemplary merge conflict scenario and FIG. 13 illustrates an exemplary method of the inference process.

The inference process generates a merge resolution as an interleaving of the source code lines from programs A, B, and code base O. The neural decoder transformer model is used to rank the lines of programs A, B, and O for inclusion into a candidate merge resolution based on a probability of a next token to complete a given context. The inference process uses a variant of a beam search to determine the lines to incorporate into a resolution and in a particular order based on a prediction of the next token to complete a given context. A threshold is used to control the search which ends when the probability scores are below the threshold.

The inference process is initiated through receipt of a merge conflict scenario (block 1302). The merge conflict scenario can be represented in a diff-formatted file 1200 as shown in FIG. 12. The diff-formatted file 1200 identifies the regions in program A and program B having changes to code base O between the markers "<<<<<<<<" and ">>>>>>>". The conflict is shown between the markers "|||||||" and "=======". The source code lines that precede the "<<<<<<<<" marker is referred to as the prefix and the source code lines that follow the ">>>>>>>" markers are referred to as the suffix.

The physical source code lines involved in the merge conflict scenario, (A, B, O) are extracted and form the set L (block 1304). As shown in FIG. 12, there are five source code lines in the set L 1202 which include the line "A=NP.ZEROS ((1,2))" from program A, lines "SHAPE=(1,2), A=NP.ZEROS(SHAPE)" from code base O, and lines "SHAPE=(1,2), A=NP.ONES(SHAPE)" from program B.

The inference process iterates through each line i in L (block 1306). Initially, the candidate resolution is empty. The candidate resolution is the predicted merge program that consists of interleaved lines from program A, B, and/or O.

At each iteration, a candidate context is generated as the concatenation of the prefix with the candidate resolution decoded thus far and line i (block 1308). The neural decoder transformer model is invoked with the candidate context to obtain a (token, score) for each token in the model's vocabulary (block 1310). The score is the log probability that the associated token is likely to be the next token in the candidate resolution.

The candidate tuples (token, score) are ranked by descending score order and the line associated with the token having the highest score is selected as the next line added to the candidate resolution (block 1312). If the highest score is greater than a threshold (block 1314—Yes), then the line is appended to the candidate resolution and eliminated from the set L (block 1316). This procedure is repeated (blocks 1306-1314) until there are no more lines left to select in A, B, or code base O or until the probability scores are below a threshold (block 1314—no). If the highest score is less than the threshold (block 1314—no), then the decoding process ends and the candidate resolution decoded thus far is returned (block 1318).

Turning to FIG. 12, at the first iteration 1204, the candidate samples for each line are shown in box 1206. Each sample is a concatenation of the prefix and the line since the candidate resolution at this point is empty. The neural decoder transformer model generates a tuple (token, score) for each line as shown in box 1208. The scores are ranked and the highest score belongs to the first candidate line which is then added to the candidate resolution 1210 and deleted from the set L.

At the second iteration 1212, the candidate samples for each line are shown in box 1214. Each sample is a concatenation of the prefix, the decoded resolution region thus far, and a line. The neural decoder transformer model generates a tuple (token, score) for each line as shown in box 1216. The scores are ranked and the highest score belongs to the third line which is added to the candidate resolution 1218 and deleted from the set L.

At the third iteration 1220, the candidate samples for each line are shown in box 1222. Each sample is a concatenation of the prefix, the decoded resolution region thus far, and a line. The neural decoder transformer model generates a tuple (token, score) for each line as shown in box 1224. The scores are ranked. The highest score is below the threshold, so the decoding process stops and the decoded resolution is returned.

Attention now turns to a discussion of an implementation of the neural transformer models.

Deployed Decoder Model

Figure 14:
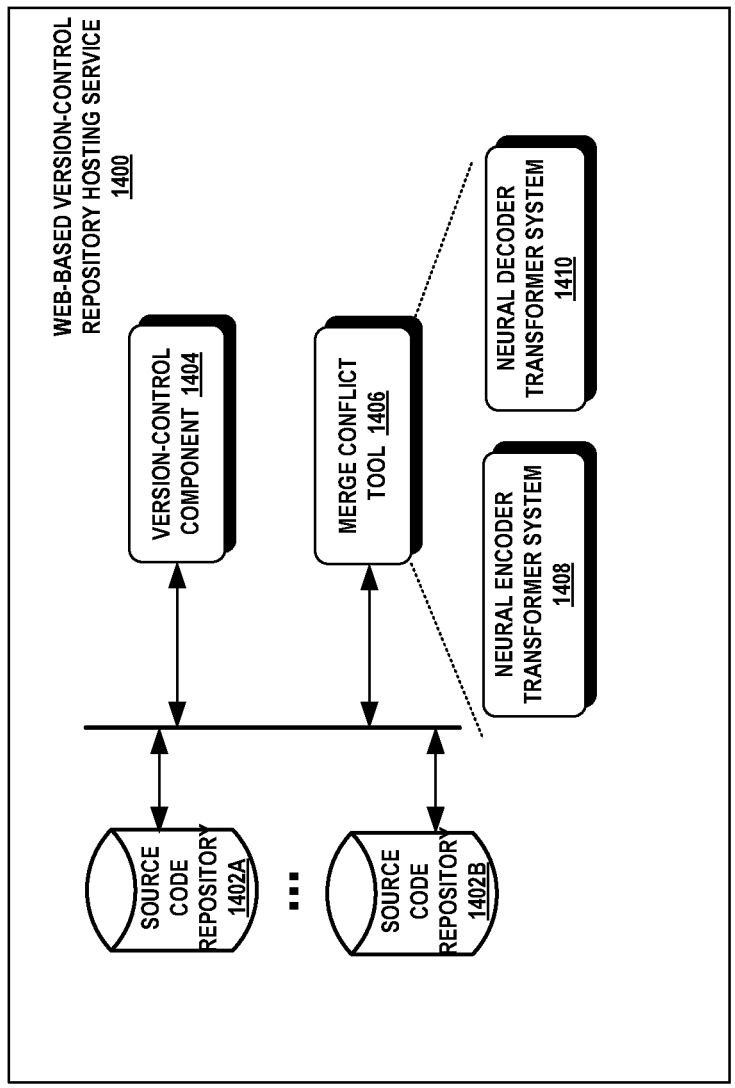
FIG. 14 is a schematic diagram illustrating an implementation of the neural transformer models in a web-based version-controlled repository hosting service.

In one aspect, the neural transformer models are deployed as part of a web-based version-control hosting service. Turning to FIG. 14, there is shown an exemplary web-based version-control hosting service 1400. The service 1400 is a file archive and web hosting service for source code, documentation, and other related data stored in source code repositories 1402A, 1402B ("1402"). The source code repositories may be publicly-accessible or private. The service 1400 includes a version-control component 1404 that tracks changes made to the files in a source code repository over time.

The service 1400 includes a merge conflict tool 1406 that automatically generates proposed merge resolutions upon detection of a program merge or a resolution strategy. The merge conflict tool 1406 monitors the merge operations performed at a source code repository and automatically generates either a resolution strategy using the neural encoder transformer system 1408 or a resolution using the neural decoder transformer system 1410.

Exemplary Operating Environment

Figure 15:
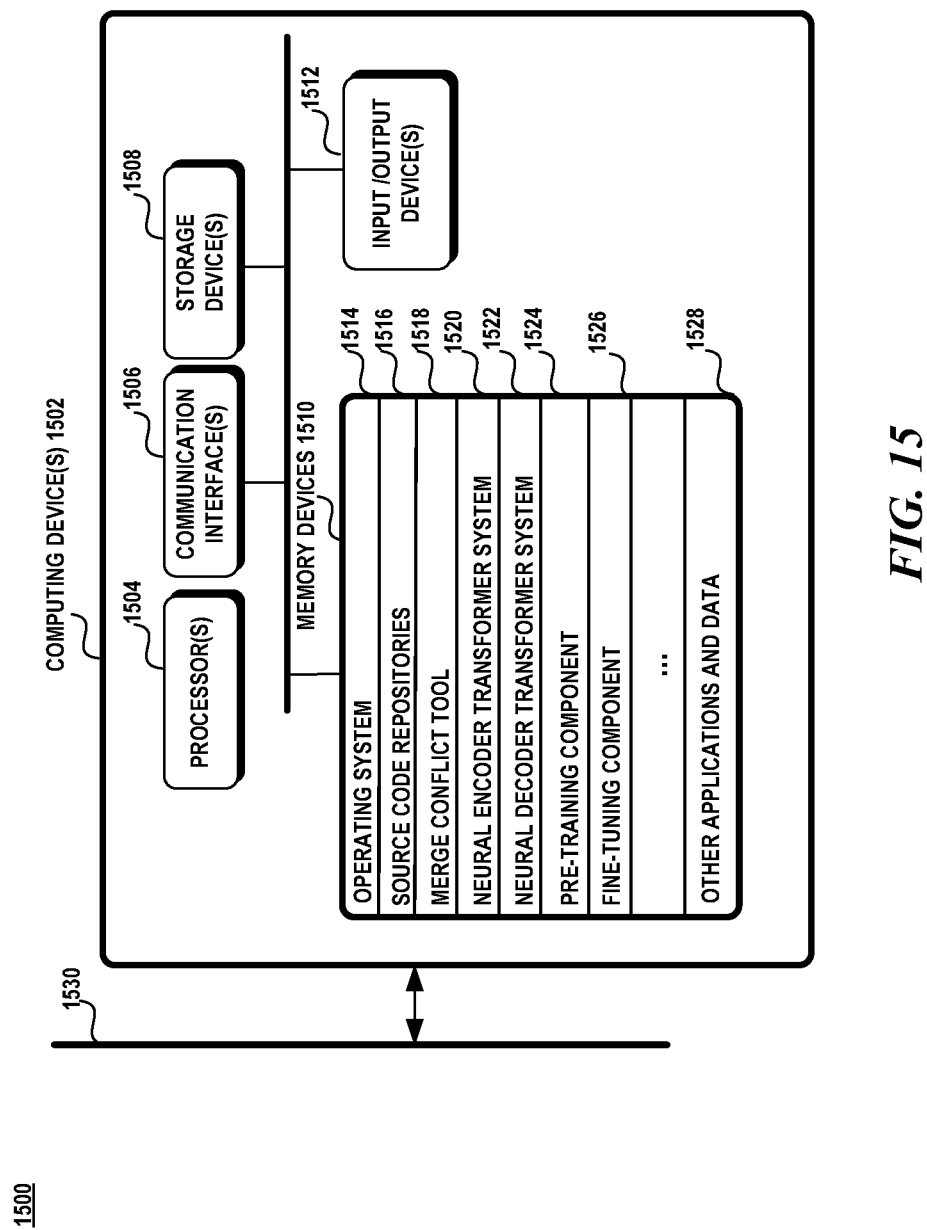
FIG. 15 is a block diagram illustrating an exemplary operating environment.

Attention now turns to a discussion of an exemplary operating environment. FIG. 15 illustrates an exemplary operating environment 1500 in which one or more computing devices 1502 are used to train and utilize the neural transformer models. However, it should be noted that the aspects disclosed herein is not constrained to any particular configuration of devices. Computing devices 1502 may be configured as a cloud service that generates the neural transformer model as a service for merge resolution. It should be noted that the operating environment is not limited to any particular configuration and other configurations are possible.

A computing device 1502 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 1500 may be configured in a network environment, a distributed environment, a multi-processor environment, or a stand-alone computing device having access to remote or local storage devices.

The computing device 1502 may include one or more processors 1504, one or more communication interfaces 1506, one or more storage devices 1508, one or more input/output devices 1512, and one or more memory devices 1510. A processor 1504 may be any commercially available or customized processor and may include dual microprocessors and multi-processor architectures. A communication interface 1506 facilitates wired or wireless communications between the computing device 1502 and other devices. A storage device 1508 may be computer-readable medium that does not contain propagating signals, such as modulated data signals transmitted through a carrier wave. Examples of a storage device 1508 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 1508 in the computing device 1502. The input/output devices 1512 may include a keyboard, mouse, pen, voice input device, touch input device, display, speakers, printers, etc., and any combination thereof.

A memory device 1510 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 1510 may also include one or more external storage devices or remotely located storage devices that do not pertain to propagated signals, such as modulated data signals transmitted through a carrier wave.

The memory device 1510 may contain instructions, components, and data. A component is a software program that performs a specific function and is otherwise known as a module, program, component, and/or application. The memory device 1510 may include an operating system 1514, source code repositories 1516, merge conflict tool 1518, neural encoder transformer system 1520, neural decoder transformer system 1522, pre-training component 1524, fine-tuning component 1526, and other applications and data 1528.

The computing devices 1502 may be communicatively coupled via a network 1530. The network 1530 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 1530 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

A system is disclose comprising one or more processors; and a memory that stores one or more programs that are configured to be executed by the one or more processors. The one or more programs including instructions to perform acts that: obtain a merge conflict tuple (A, B, O), where A and B are programs having modifications made to code base O; represent the merge tuple as n input sequences; and predict a resolution strategy to merge changes in program A and changes in program B into code base O using a neural transformer system, wherein the neural transformer system includes n neural encoder transformer models, wherein each neural encoder transformer model receives a select one of the n input sequences, wherein the neural transformer system aggregates output from each neural encoder transformer model to generate an output probability distribution of c classes, wherein a class represents a particular resolution strategy, wherein the predicted resolution strategy has a highest probability.

In one aspect, the n input sequences include a first input sequence based on changes in program A relative to code base O, a second input sequence based on changes in program B relative to code base O, a third input sequence based on changes to code base O relative to program A, and a fourth input sequence based on changes to code base O relative to program B.

In one or more aspects, each neural encoder transformer model is pre-trained on an unsupervised training dataset of source code in multiple programming languages, each of the pre-trained neural encoder transformer models is fine-tuned on a select one of the n input sentences, a resolution strategy indicates no resolution possible, a resolution strategy indicates selecting changes from program A only or selecting changes from program B only, and a resolution strategy is an interleaving of lines of source code from program A, program B and/or code base O in a particular order.

A method is disclosed that is performed on a computing device having a processor and a memory. The method, comprises: pre-training a neural encoder transformer model with attention on an unsupervised training dataset of source code programs; obtaining a plurality of merge conflict tuples (A, B, O), wherein A and B are programs having modifications made to code base O; constructing the plurality of merge conflict tuples into n fine-tuning datasets; fine-tuning each of n pre-trained encoder transformer models on a select one of the n fine-tuning datasets; aggregating output of each fine-tuned encoder transformer models; and transforming the aggregated output into an output probability distribution of c classes of resolution strategies.

In one aspect, the n fine-tuning datasets include embeddings based on changes in program A relative to code base O, embeddings based on changes in program B relative to code base O, embeddings based on changes to code base O relative to program A, and embeddings based on changes to code base O relative to program B. In an aspect, fine-tuning each of the pre-trained neural encoder transformer models further comprises: freezing parameters of each encoder block of each pre-trained neural encoder transformer model. In an aspect, fine-tuning each of the pre-trained neural encoder transformer models further comprises: updating parameters of an output classification layer and an aggregation layer of each pre-trained neural encoder transformer model.

In an aspect, pre-training the neural encoder transformer model with attention further comprises: extracting a plurality of source code programs in a plurality of programming languages; converting each source code program into an ordered sequence of tokens; and masking out select tokens in the ordered sequence of tokens. In an aspect, the resolution strategies include incorporate changes from program A only, incorporate changes from program B only or do not incorporate any changes into code base O. In an aspect, the resolution strategies include interleaving lines of source code from program A and program B in a particular order. In an aspect, the resolution strategies include removing lines of source code from the code base O and selecting lines of source code from program A or program B.

A system is disclosed comprising one or more processors and a memory that stores one or more programs. The one or more programs are configured to be executed by the one or more processors. The one or more programs include instructions to perform acts that: obtain a merge conflict tuple (A, B, O), wherein A and B are programs having modifications made to code base O; and generate a merge resolution for the merge conflict tuple using a neural transformer model, the merge resolution including an interleaving of lines of source code from program A, program B, or code base O, wherein inclusion of the lines of source code in the merge resolution is predicted using a neural transformer model, wherein the neural transformer model predicts an order of the lines of source code appended to a current state of the merge resolution by predicting a next token to follow a given context, wherein the predicted next token has a highest probability of following the given context, wherein the predicted next token corresponds to a select one of the lines of source code from program A, program B or code base O.

In one aspect, the one or more programs include further instructions to perform acts that: create a candidate context for each line of source code in program A, program B, and code base O; and invoke the neural transformer model to predict a probability of a next token given the candidate context for each line of source code in program A, program B, and code base O. In one aspect, the candidate context includes a prefix, a current state of the merge resolution, and a select line of source code from program A, program B, or code base O. In an aspect, the one or more programs include further instructions to perform acts that: rank the predicted probabilities of the next token given the candidate context; select a line of source code from program A, program B and code base O associated with a predicted next token having a highest predicted probability; and append the selected line of source code to the merge resolution. In an aspect, the neural transformer model includes a neural decoder transformer model with attention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

What is claimed:

1. A system comprising:
   one or more processors; and
   a memory that stores one or more programs that are configured to be executed by the one or more processors, the one or more programs including instructions to perform acts that:
   obtain a merge conflict tuple (A, B, O), where A and B are programs having modifications made to code base O;
   represent the merge conflict tuple as n input sequences, wherein the n input sequences comprise a first input sequence based on changes in program A relative to code base O, a second input sequence based on changes in program B relative to code base O, a third input sequence based on changes to code base O relative to program A, and a fourth input sequence based on changes to code base O relative to program B;
   construct a plurality of edit sequences comprising a first edit sequence and a second edit sequence, wherein the first edit sequence represents differences and similarities between code base O and program A,
   wherein the second edit sequence represents differences and similarities between code base O and program B; and
   predict a resolution strategy that determines how to merge changes in program A and/or changes in program B into code base O using a neural encoder transformer system, wherein the resolution strategy represents proposed changes to the merge conflict tuple to resolve a merge conflict,
   wherein the neural encoder transformer system includes n neural encoder transformer models, wherein each neural encoder transformer model receives a select one of the n input sequences concatenated with a corresponding edit sequence, wherein each neural encoder transformer model is fine-tuned on the select one of the n input sequences,
   wherein the neural encoder transformer system aggregates output from each of the n neural encoder transformer models to generate an output probability distribution of c classes, wherein a class represents a particular resolution strategy, wherein the predicted resolution strategy has a highest probability.

2. The system of claim 1, wherein the resolution strategy indicates to take a string concatenation of changes from program A first and then take changes from program B or to take a string concatenation of changes from program B first and then take changes from program A.

3. The system of claim 1, wherein each neural encoder transformer model is pre-trained on an unsupervised training dataset of source code in multiple programming languages.

4. The system of claim 1, wherein the resolution strategy indicates an interleaving of source code lines from program A and program B with new source code lines added that were not present in program A, program B or code base O.

5. The system of claim 1, wherein the resolution strategy indicates no resolution possible.

6. The system of claim 1, wherein the resolution strategy indicates selecting the changes from program A only or selecting the changes from program B only.

7. The system of claim 1, wherein the resolution strategy is an interleaving of lines of source code from program A, program B and/or code base O in a particular order.

8. A method performed on a computing device having a processor and a memory, the method, comprising:
   pre-training n neural encoder transformer models with attention on an unsupervised training dataset of source code programs;
   obtaining a plurality of merge conflict tuples (A, B, O), wherein A and B are programs having modifications made to code base O;
   constructing the plurality of merge conflict tuples into n fine-tuning datasets, wherein the n fine-tuning datasets comprise a first fine-tuning dataset based on changes in program A relative to code base O concatenated with a first edit sequence,
   wherein the first edit sequence represents differences and/or similarities between program A and code base O, a second fine-tuning dataset based on changes in program B relative to code base O concatenated with a second edit sequence,
   wherein the second edit sequence represents differences and/or similarities between program B and code base O, a third fine-tuning dataset based on changes to code base O relative to program A concatenated with the first edit sequence, and a fourth fine-tuning dataset based on changes to code base O relative to program B concatenated with the second edit sequence;
   fine-tuning each of n pre-trained neural encoder transformer models on a select one of the n fine-tuning datasets;
   aggregating output of each of the n fine-tuned neural encoder transformer models; and
   transforming the aggregated output into an output probability distribution of c classes of resolution strategies, wherein each of the c classes of resolution strategies represents a proposed change to the merge conflict tuple to resolve a merge conflict.

9. The method of claim 8, wherein the n fine-tuning datasets include embeddings based on changes in program A relative to code base O, embeddings based on changes in program B relative to code base O, embeddings based on changes to code base O relative to program A, and embeddings based on changes to code base O relative to program B.

10. The method of claim 8, wherein fine-tuning each of the n pre-trained neural encoder transformer models further comprises:
freezing parameters of each encoder block of each pre-trained neural encoder transformer model.

11. The method of claim 10, further comprising:
updating parameters of an output classification layer and an aggregation layer of each of the n pre-trained neural encoder transformer model.

12. The method of claim 8, wherein pre-training the neural encoder transformer model with attention further comprises:
extracting a plurality of source code programs in a plurality of programming languages;
converting each source code program into an ordered sequence of tokens; and
masking out select tokens in the ordered sequence of tokens.

13. The method of claim 8, wherein the resolution strategies include incorporate changes from program A only, incorporate changes from program B only or do not incorporate any changes into code base O.

14. The method of claim 8, wherein the resolution strategies include interleaving lines of source code from program A and program B in a particular order.

15. The method of claim 8, wherein the resolution strategies include removing lines of source code from the code base O and selecting lines of source code from program A or program B.

16. A system, comprising:
one or more processors; and
a memory that stores one or more programs that are configured to be executed by the one or more processors, wherein the one or more programs including instructions to perform acts that:
obtain a merge conflict tuple (A, B, O), wherein A and B are programs having modifications made to code base O; and
generate a merge resolution for the merge conflict tuple, wherein the generation of the merge resolution generates a current state of the merge resolution at each of a plurality of iterations, wherein at each iteration a current state of the merge resolution is generated using a neural decoder transformer model,
wherein the merge resolution comprises an interleaving of lines of source code from program A, program B, and/or the code base O, wherein inclusion of the lines of source code in the current state of the merge resolution is predicted at each iteration using the neural decoder transformer model, wherein the neural decoder transformer model predicts an order of the lines of source code appended to the current state of the merge resolution by predicting a next token to follow a given context,
wherein the predicted next token has a highest probability of following the given context, wherein the predicted next token corresponds to a select one of the lines of source code from the program A, the program B or the code base O.

17. The system of claim 16, wherein the one or more programs include further instructions to perform acts that:
create a candidate context for each line of source code in the program A, the program B, and the code base O; and
invoke the neural transformer model to predict a probability of a next token given the candidate context for each line of source code in the program A, the program B, and the code base O.

18. The system of claim 17, wherein the candidate context includes a prefix, a current state of the merge resolution, and a select line of source code from the program A, the program B, or the code base O.

19. The system of claim 17, wherein the one or more programs include further instructions to perform acts that:
rank the predicted probabilities of the next token given the candidate context;
select a line of source code from the program A, the program B and the code base O associated with a predicted next token having a highest predicted probability; and
append the selected line of source code to the current state of the merge resolution.

* * * * *